(12) United States Patent
Yasumura

(10) Patent No.: US 6,349,046 B2
(45) Date of Patent: Feb. 19, 2002

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/814,549

(22) Filed: Mar. 22, 2001

(30) Foreign Application Priority Data

Mar. 24, 2000 (JP) ............................................. 12-088539

(51) Int. Cl.[7] ............................................. H02M 3/335
(52) U.S. Cl. .............................. 363/21.02; 363/21.04; 363/79; 363/97
(58) Field of Search ................................. 363/16, 21.01, 363/21.02, 21.04, 21.06, 21.1, 21.12, 21.14, 21.18, 79, 97, 131

(56) References Cited

U.S. PATENT DOCUMENTS 4,318,165 A * 3/1982 Kornrumpf .............. 363/21.02
5,883,795 A * 3/1999 Farrington ............... 363/21.04
6,295,213 B1 * 9/2001 Smith ..................... 363/21.01

* cited by examiner

*Primary Examiner*—Jessica Han
(74) *Attorney, Agent, or Firm*—Frommer Lawrence & Haug LLP; William S. Frommer

(57) ABSTRACT

In a configuration of a complex resonance type switching converter provided with a voltage resonance type converter on the primary side and a parallel resonant circuit or a series resonant circuit on the secondary side, control of voltage obtained at a secondary winding and control for constant voltage on the secondary side are achieved by providing an active clamp circuit on the secondary side. The switching frequency of the circuit is constant. Thus, products having low withstand voltage may be selected as components such as a switching device and a resonant capacitor to be provided on the secondary side of the power supply circuit. In addition, it is possible to simplify configuration for constant-voltage control.

5 Claims, 17 Drawing Sheets

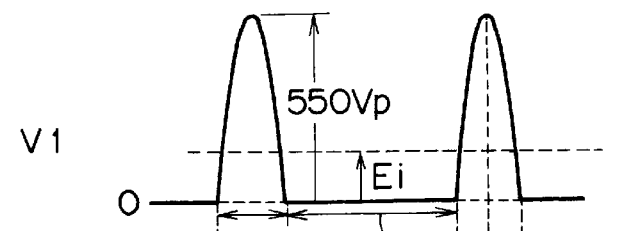
FIG. 2A  V1
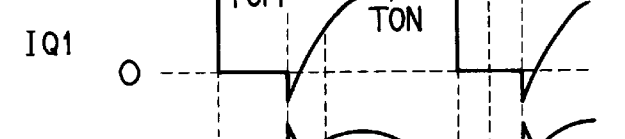
FIG. 2B  IQ1
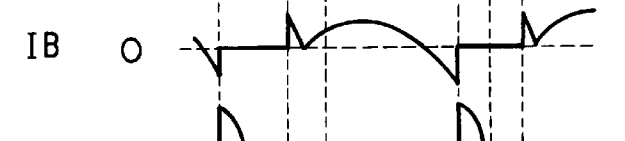
FIG. 2C  IB
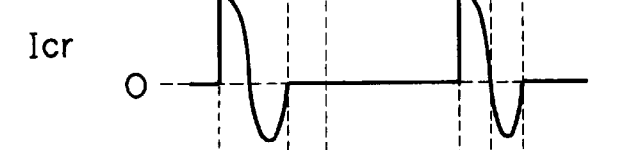
FIG. 2D  Icr
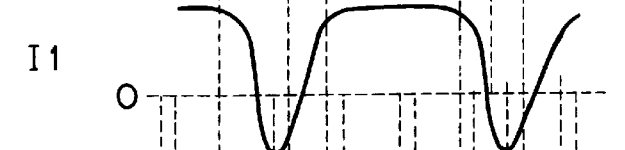
FIG. 2E  I1
FIG. 2F  V0
FIG. 2G  V3
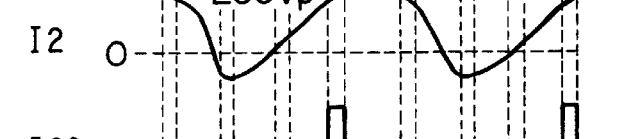
FIG. 2H  I2
FIG. 2I  IC2
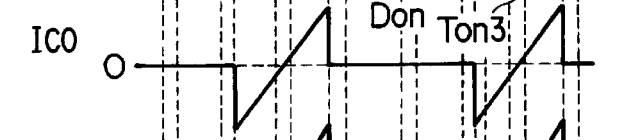
FIG. 2J  IC0
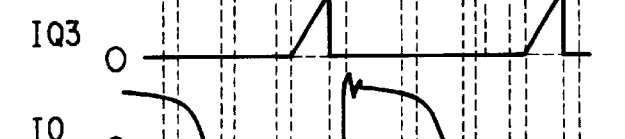
FIG. 2K  IQ3
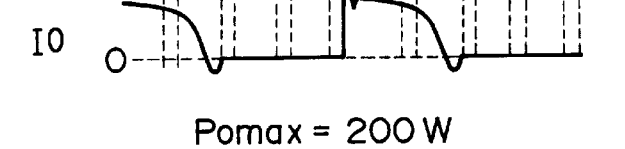
FIG. 2L  I0
Pomax = 200 W

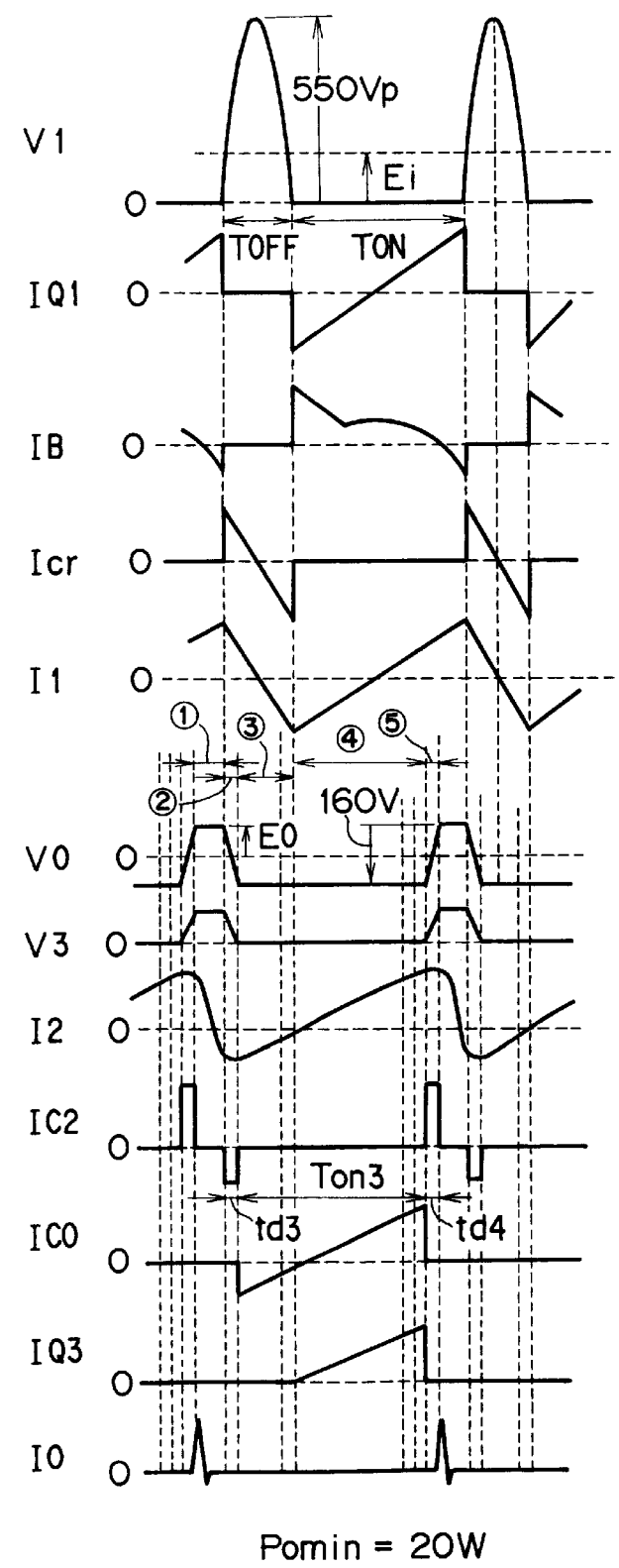

FIG. 7A V1
FIG. 7B IQ1
FIG. 7C IB
FIG. 7D Icr
FIG. 7E I1
FIG. 7F V0
FIG. 7G V2
FIG. 7H I2
FIG. 7I V3
FIG. 7J IC0
FIG. 7K I0

Pomin = 20 W

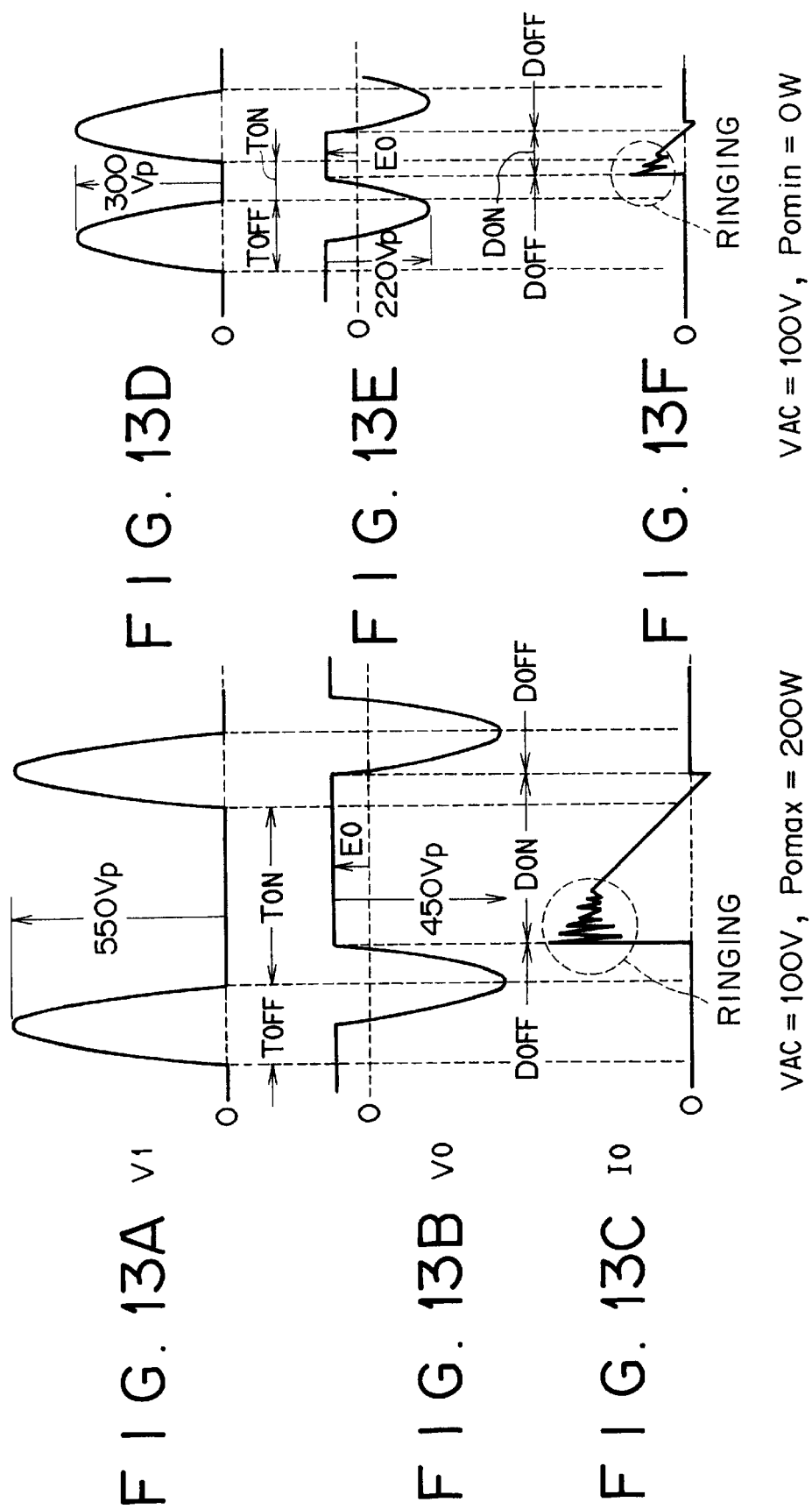

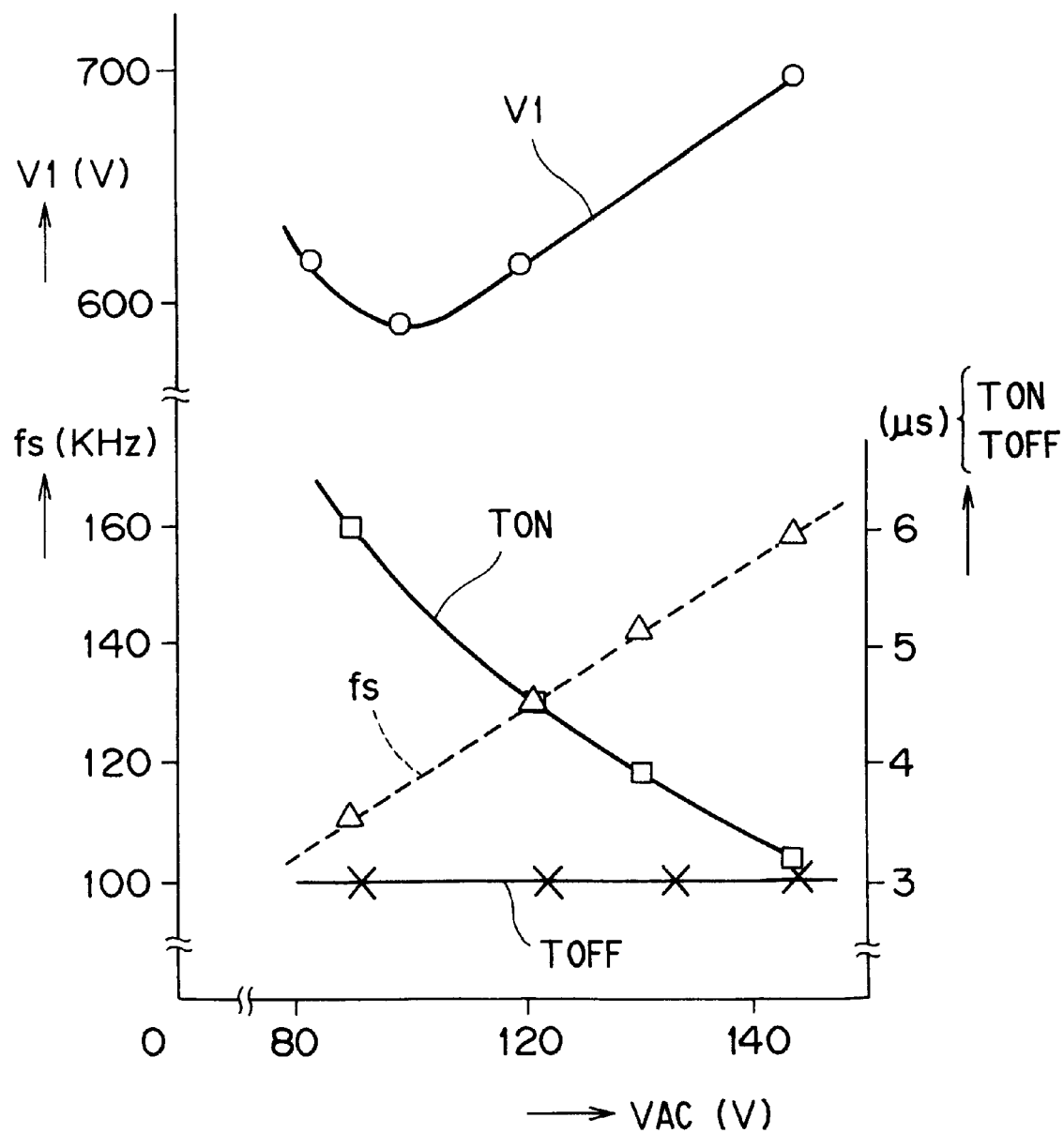
F I G. 18 ously proposed by the present applicant. A resonance type converter makes it possible to readily obtain high power conversion efficiency, and to achieve low noise because the resonance type converter forms a sine-wave waveform in switching operation. The resonance type converter has another advantage of being able to be formed by a relatively small number of parts.

SWITCHING POWER SUPPLY CIRCUIT

BACKGROUND OF THE INVENTION

The present invention relates to a switching power supply circuit to be provided as a power supply for various electronic apparatus.

Switching power supply circuits employing switching converters such as flyback converters and forward converters are widely known. These switching converters form a rectangular waveform in switching operation, and therefore there is a limit to suppression of switching noise. It is also known that because of their operating characteristics, there is a limit to improvement of power conversion efficiency.

Hence, various switching power supply circuits using various resonance type converters have been previously proposed by the present applicant. A resonance type converter makes it possible to readily obtain high power conversion efficiency, and to achieve low noise because the resonance type converter forms a sine-wave waveform in switching operation. The resonance type converter has another advantage of being able to be formed by a relatively small number of parts.

FIG. 9 is a circuit diagram showing an example of a prior art switching power supply circuit that can be formed according to an invention previously proposed by the present applicant.

The power supply circuit shown in FIG. 9 is provided with a full-wave rectifier circuit comprising a bridge rectifier circuit Di and a smoothing capacitor Ci. The full-wave rectifier circuit serves as a rectifying and smoothing circuit supplied with a commercial alternating-current power (alternating-current input voltage VAC) to provide a direct-current input voltage. The rectifying and smoothing circuit generates a rectified and smoothed voltage Ei whose level is equal to that of the alternating-current input voltage VAC multiplied by unity.

A voltage resonance type converter that includes a switching device Q1 and performs switching operation by a so-called single-ended system is provided as a switching converter for interrupting the rectified and smoothed voltage Ei (direct-current input voltage) inputted from the rectifying and smoothing circuit.

The voltage resonance type converter in this case is externally excited, and a MOS-FET, for example, is used as the switching device Q1. A drain of the switching device Q1 is connected to a positive electrode of a smoothing capacitor Ci via a primary winding N1 of an insulating converter transformer PIT, while a source of the switching device Q1 is connected to a ground on the primary side.

A parallel resonant capacitor Cr is connected in parallel with the drain and source of the switching device Q1. Capacitance of the parallel resonant capacitor Cr and leakage inductance obtained at the primary winding N1 of the insulating converter transformer PIT form a primary-side parallel resonant circuit. The parallel resonant circuit performs resonant operation according to switching operation of the switching device Q1. Thus, the switching operation of the switching device Q1 is of a voltage resonance type.

Also, a clamp diode (so-called body diode) DD is connected in parallel with the drain and source of the switching device Q1. The clamp diode DD forms a path of clamp current that flows during an off period of the switching device.

In this case, the drain of the switching device Q1 is connected to an oscillating circuit 41 in a switching driver 10B, which will be described next. An output of the drain supplied to the oscillating circuit 41 is used in switching frequency control to variably control an on period within one switching cycle, which will be described later.

The switching device Q1 is driven for switching operation by the switching driver 10B which is formed by integrating the oscillating circuit 41 and a driving circuit 42, and the switching frequency of the switching device Q1 is variably controlled for the purpose of constant-voltage control. Incidentally, the switching driver 10B in this case is provided as a single integrated circuit (IC), for example.

The switching d river 10B is connected to a line of the rectified and smoothed voltage Ei via a starting resistance RS. The switching driver 10B starts operation by being supplied with the power supply voltage via the starting resistance Rs at the start of power supply, for example.

The oscillating circuit 41 in the switching driver 10B performs oscillating operation to generate and output an oscillating signal. The driving circuit 42 converts the oscillating signal into a driving voltage, and then outputs the driving voltage to a gate of the switching device Q1. Thus, the switching device Q1 performs switching operation according to the oscillating signal generated by the oscillating circuit 41. Therefore, the switching frequency and duty ratio of an on/off period within one switching cycle of the switching device Q1 is determined depending on the oscillating signal generated by the oscillating circuit 41.

The oscillating circuit 41 changes the frequency of the oscillating signal (switching frequency fs) on the basis of the level of a secondary-side direct-current output voltage E0 inputted via a photocoupler 40, which will be described later. The oscillating circuit 41 changes the switching frequency fs and at the same time, controls the waveform of the oscillating signal in such a manner that a period TOFF during which the switching device Q1 is turned off is fixed and a period TON (conduction angle) during which the switching device Q1 is turned on is changed. The period TON (conduction angle) is variably controlled on the basis of the peak value of a parallel resonance voltage V1 across the parallel resonant capacitor Cr. As a result of such operation of the oscillating circuit 41, the secondary-side direct-current output voltage E0 is stabilized, as will be described later.

The insulating converter transformer PIT transmits switching output of the switching device Q1 to the secondary side of the switching power supply circuit.

As shown in FIG. 11, the insulating converter transformer PIT has an E-E-shaped core formed by combining E-shaped cores CR1 and CR2 made for example of a ferrite material in such a manner that magnetic legs of the core CR1 are opposed to magnetic legs of the core CR2. A primary winding N1 and a secondary winding N2 are wound around a central magnetic leg of the E-E-shaped core in a state divided from each other by using a dividing bobbin B. Also, a gap G is formed in the central magnetic leg, as shown in FIG. 11, to provide loose coupling at a required coupling coefficient.

The gap G can be formed by making the central magnetic leg of each of the E-shaped cores CR1 and CR2 shorter than two outer legs of each of the E-shaped cores CR1 and CR2. The coupling coefficient k is set for example to be k≈0.85 to provide a loosely coupled state, whereby a saturated state is not readily obtained.

As shown in FIG. 9, an ending point of the primary winding N1 of the insulating converter transformer PIT is connected to the drain of the switching device Q1, while a starting point of the primary winding N1 is connected to the positive electrode of the smoothing capacitor Ci (rectified and smoothed voltage Ei). Hence, the primary winding N1 is supplied with the switching output of the switching device Q1, whereby an alternating voltage whose cycle corresponds to the switching frequency of the switching device Q1 occurs in the primary winding N1.

An alternating voltage induced by the primary winding N1 occurs in the secondary winding N2 on the secondary side of the insulating converter transformer PIT. In this case, a secondary-side parallel resonant capacitor C2 is connected in parallel with the secondary winding N2, and therefore leakage inductance L2 of the secondary winding N2 and capacitance of the secondary-side parallel resonant capacitor C2 form a parallel resonant circuit. The parallel resonant circuit converts the alternating voltage induced in the secondary winding N2 into a resonance voltage, whereby voltage resonance operation is obtained on the secondary side.

Thus, the power supply circuit is provided with the parallel resonant circuit to convert switching operation into voltage resonance type operation on the primary side, and the parallel resonant circuit to provide voltage resonance operation on the secondary side. In the present specification, the switching converter provided with resonant circuits on the primary side and the secondary side is also referred to as a "complex resonance type switching converter."

A rectifying and smoothing circuit comprising a bridge rectifier circuit DBR and a smoothing capacitor C0 is provided on the secondary side of the power supply circuit formed as described above, whereby a secondary-side direct-current output voltage E0 is obtained. This means that according to the configuration of the power supply circuit, full-wave rectifying operation on the secondary side is provided by the bridge rectifier circuit DBR. In this case, the bridge rectifier circuit DBR is supplied with the resonance voltage by the secondary-side parallel resonant circuit, and then generates the secondary-side direct-current output voltage E0 whose level is substantially equal to that of the alternating voltage induced in the secondary winding N2.

The secondary-side direct-current output voltage E0 is also inputted to the oscillating circuit 41 in the switching driver 10B on the primary side via the photocoupler 40 insulating the primary side from the secondary side.

As for secondary-side operation of the insulating converter transformer PIT, mutual inductance M between inductance L1 of the primary winding N1 and inductance L2 of the secondary winding N2 becomes +M or −M, depending on polarity (winding direction) of the primary winding N1 and the secondary winding N2, a connecting relation of a rectifier diode D0 (D01, D02), and change in polarity of the alternating voltage induced in the secondary winding N2.

For example, an equivalent of a circuit shown in FIG. 12A has a mutual inductance of +M, while an equivalent of a circuit shown in FIG. 12B has a mutual inductance of −M.

This will be applied to the secondary-side operation of the insulating converter transformer PIT shown in FIG. 9; when the alternating voltage obtained at the secondary winding N2 has a positive polarity, an operation that causes rectified current to flow in the bridge rectifier circuit DBR can be considered a +M operation mode (forward operation), whereas when the alternating voltage obtained at the secondary winding N2 has a negative polarity, an operation that causes rectified current to flow in the bridge rectifier diode DBR can be considered a −M operation mode (flyback operation). As the alternating voltage obtained at the secondary winding N2 changes from positive polarity to negative polarity and vice versa, the operation mode of the mutual inductance changes from +M to −M and vice versa, respectively.

With such a configuration, power increased by effects of the primary-side parallel resonant circuit and the secondary-side parallel resonant circuit is supplied to a load side, and accordingly the power supplied to the load side is increased as much, thereby improving a rate of increase of maximum load power.

This is achieved because as described earlier with reference to FIG. 11, the gap G is formed in the insulating converter transformer PIT to provide loose coupling at a required coupling coefficient, and thereby a saturated state is not readily obtained. For example, when the gap G is not provided in the insulating converter transformer PIT, it is highly likely that the insulating converter transformer PIT reaches a saturation state and then performs abnormal flyback operation. Therefore it is difficult to expect that the full-wave rectifying operation mentioned above will be properly performed.

Stabilizing operation of the circuit shown in FIG. 9 is as follows.

As described above, the oscillating circuit 41 in the switching driver 10B on the primary side is supplied with the secondary-side direct-current output voltage E0 via the photocoupler 40. The oscillating circuit 41 changes the frequency of the oscillating signal for output according to change in the level of the supplied secondary-side direct-current output voltage E0. This means an operation of changing the switching frequency of the switching device Q1. Thus, resonance impedance of the primary-side voltage resonance type converter and the insulating converter transformer PIT is changed, and accordingly energy transmitted to the secondary side of the insulating converter transformer PIT is also changed. As a result, the secondary-side direct-current output voltage E0 is controlled so as to remain constant at a required level. This means that the power supply is stabilized.

When the oscillating circuit 41 of the power supply circuit shown in FIG. 9 changes the switching frequency, the period TOFF during which the switching device Q1 is turned off is fixed and the period TON during which the switching device Q1 is turned on is variably controlled, as described above. Specifically, by variably controlling the switching frequency as an operation for constant-voltage control, the power supply circuit controls the resonance impedance for switching output, and at the same time, controls the conduction angle of the switching device within a switching cycle (PWM control). This complex control operation is realized by a single control circuit system. In the present specification, such complex control is also referred to as "a complex control method."

FIG. 10 is a circuit diagram showing another example of a power supply circuit formed according to an invention previously proposed by the present applicant. In the figure, the same parts as in FIG. 9 are identified by the same reference numerals, and their description will be omitted.

A self-excited voltage resonance type converter circuit that performs single-ended operation by a switching device Q1 is provided on the primary side of the power supply circuit of FIG. 10. In this case, a high voltage bipolar transistor (BJT; junction transistor) is employed as the switching device Q1.

A base of the switching device Q1 is connected to a positive electrode side of a smoothing capacitor Ci (rectified and smoothed voltage Ei) via a base current limiting resistance RB and a starting resistance RS, so that base current at the start of power supply is taken from a line of a rectifying and smoothing circuit. Connected between the base of the switching device Q1 and a primary-side ground is a series resonant circuit for self-oscillation driving that is formed by connecting a driving winding NB, a resonant capacitor CB, and the base current limiting resistance RB in series with each other.

A clamp diode DD inserted between the base of the switching device Q1 and a negative electrode of the smoothing capacitor Ci (primary-side ground) forms a path of clamp current that flows during the off period of the switching device Q1. A collector of the switching device Q1 is connected to one end of a primary winding N1 of an insulating converter transformer PIT, while an emitter of the switching device Q1 is grounded.

A parallel resonant capacitor Cr is connected in parallel with the collector and emitter of the switching device Q1. Also in this case, capacitance of the parallel resonant capacitor Cr and leakage inductance L1 of the primary winding N1 side of the insulating converter transformer PIT form a primary-side parallel resonant circuit of the voltage resonance type converter.

An orthogonal type control transformer PRT shown in FIG. 10 is a saturable reactor provided with a resonance current detecting winding ND, the driving winding NB, and a control winding NC. The orthogonal type control transformer PRT is provided to drive the switching device Q1 and effect control for constant voltage.

The structure of the orthogonal type control transformer PRT is a cubic core, not shown in the figure, formed by connecting two double-U-shaped cores each having four magnetic legs with each other at ends of the magnetic legs. The resonance current detecting winding ND and the driving winding NB are wound around two given magnetic legs of the cubic core in the same winding direction, and the control winding NC is wound in a direction orthogonal to the resonance current detecting winding ND and the driving winding NB.

In this case, the resonance current detecting winding ND of the orthogonal type control transformer PRT is inserted in series between the positive electrode of the smoothing capacitor Ci and the primary winding N1 of the insulating converter transformer PIT, so that the switching output of the switching device Q1 is transmitted to the resonance current detecting winding ND via the primary winding N1. The switching output obtained by the resonance current detecting winding ND of the orthogonal type control transformer PRT is induced in the driving winding NB via transformer coupling, whereby an alternating voltage is generated as driving voltage in the driving winding NB. The driving voltage is outputted as driving current to the base of the switching device Q1 from a series resonant circuit (NB and CB), which forms the self-oscillation driving circuit, via the base current limiting resistance RB. Thus, the switching device Q1 performs switching operation at a switching frequency determined by the resonance frequency of the series resonant circuit. Then the switching output obtained at the collector of the switching device Q1 is transmitted to the primary winding N1 of the insulating converter transformer PIT.

The insulating converter transformer PIT provided in the circuit of FIG. 10 has the same structure as described earlier with reference to FIG. 11, thus providing loose coupling between the primary side and the secondary side.

A secondary-side parallel resonant capacitor C2 is connected in parallel with a secondary winding N2 on the secondary side of the insulating converter transformer PIT in the circuit of FIG. 10 to thereby form a secondary-side parallel resonant circuit. Thus, the power supply circuit also has a configuration of a complex resonance type switching converter.

A half-wave rectifier circuit comprising a diode D0 and a smoothing capacitor C0 is provided for the secondary winding N2 on the secondary side of the power supply circuit, so that a secondary-side direct-current output voltage E0 is obtained by half-wave rectifying operation that comprises only a forward operation. In this case, the secondary-side direct-current output voltage E0 is also inputted from a branch point to a control circuit 1, and the control circuit 1 uses the direct-current output voltage E0 as a detection voltage.

The control circuit 1 variably controls inductance LB of the driving winding NB wound in the orthogonal type control transformer PRT by changing the level of a control current (direct current) flowing through the control winding NC according to change in the level of the secondary-side direct-current output voltage E0. This results in a change in resonance conditions of the series resonant circuit including the inductance LB of the driving winding NB in the circuit for self-oscillation driving of the switching device Q1. This means an operation of changing the switching frequency of the switching device Q1, by which the secondary-side direct-current output voltage is stabilized. Also in such a configuration for constant-voltage control including the orthogonal type control transformer PRT, the switching converter on the primary side is of voltage resonance type, and therefore the power supply circuit performs operation by the complex control method, in which the power supply circuit variably controls the switching frequency and at the same time controls the conduction angle of the switching device within a switching cycle (PWM control).

FIGS. 13A to 13F are waveform diagrams showing operation of the power supply circuit shown in FIG. 10. FIGS. 13A, 13B, and 13C each show operation of the power supply circuit at an alternating-current input voltage VAC=100 V and a maximum load power Pomax=200 W. FIGS. 13D, 13E, and 13F each show operation of the power supply circuit at an alternating-current input voltage VAC=100 V and a minimum load power Pomin=0 W, or no load.

When the switching device Q1 performs switching operation on the primary side, the primary-side parallel resonant circuit performs resonant operation during the period TOFF during which the switching device Q1 is turned off. Thus, as shown in FIGS. 13A and 13D, a parallel resonance voltage V1 across the parallel resonant capacitor Cr forms a sinusoidal resonance pulse waveform during the period TOFF. In the case of the complex resonance type converter having a parallel resonant circuit as a secondary-side resonant circuit, the period TOFF during which the switching device Q1 is turned off is fixed, while the period TON during which the switching device Q1 is turned on is changed, as shown in the figures.

The voltage resonance type converter on the primary side performs switching operation at the timing described above, and thereby the rectifier diode D0 on the secondary side performs switching and rectifying operation on the alternating voltage induced in the secondary winding N2.

In this case, as shown in FIGS. 13B and 13E, a voltage Vo across the secondary winding N2 is clamped at a level of the secondary-side direct-current output voltage E0 during a period DON during which the rectifier diode D0 is turned on, while the voltage Vo forms a sinusoidal pulse waveform in a direction of negative polarity due to resonance effect of the secondary-side parallel resonant circuit during a period DOFF during which the rectifier diode D0 is turned off. As shown in FIGS. 13C and 13F, a secondary-side rectified current I0 to be stored in the smoothing capacitor C0 via the rectifier diode D0 steeply rises at the start of the period DON and thereafter gradually lowers its level, thus forming substantially a sawtooth waveform.

A comparison of FIG. 13A with FIG. 13D indicates that switching frequency fs is controlled so as to rise as load power Po is decreased, and the switching frequency fs (switching cycle) is changed while fixing the period TOFF at a constant length and changing the period TON, during which the switching device Q1 is turned on. This represents operation by the above-mentioned complex control method.

The voltage resonance type converter formed as shown in FIG. 10 changes the level of the parallel resonance voltage V1 according to variation in load power. For example, the parallel resonance voltage V1 is 550 Vp at a maximum load power Pomax=200 W, whereas the parallel resonance voltage V1 becomes 300 Vp at a minimum load power Pomin=0 W. This means that the parallel resonance voltage V1 has a tendency to rise as the load power becomes heavier.

Similarly, the peak level of the voltage Vo across the secondary winding N2 obtained during the period DOFF has a tendency to rise as the load power becomes heavier. In this case, the voltage Vo is 450 Vp at a maximum load power Pomax=200 W, whereas the voltage Vo is 220 Vp at a minimum load power Pomin=0 W.

Incidentally, the circuit shown in FIG. 9 performs substantially the same operation as described by using the waveform diagrams of FIGS. 13A to 13F.

Next, as characteristics of the power supply circuits shown in FIGS. 9 and 10, FIG. 14 shows characteristics of variations in the switching frequency fs, the period TOFF and the period TON within a switching cycle, and the parallel resonance voltage V1 with respect to the alternating-current input voltage VAC at a maximum load power Pomax=200 W.

First, FIG. 14 shows that the switching frequency fs is changed within a range of fs=110 KHz to 140 KHz for the alternating-current input voltage VAC=90 V to 140 V. This indicates an operation of stabilizing variation in the secondary-side direct-current output voltage E0 according to variation in direct-current input voltage. As for variation in the alternating-current input voltage VAC, the switching frequency is controlled so as to rise as the level of the alternating-current input voltage VAC is increased.

As for the period TOFF and the period TON within one switching cycle, the period TOFF is constant, as contrasted with the switching frequency fs, whereas the period TON is reduced so as to form a quadratic curve as the switching frequency fs is increased. This also indicates an operation for controlling the switching frequency by the complex control method.

The parallel resonance voltage V1 also changes according to variation in commercial alternating-current power VAC; as shown in FIG. 14, the level of the parallel resonance voltage V1 rises as the alternating-current input voltage VAC is increased.

FIG. 15 shows another power supply circuit according to an invention previously proposed by the present applicant. The power supply circuit shown in FIG. 15 is a complex resonance type switching converter provided with a series resonant circuit on the secondary side. In the figure, the same parts as in FIGS. 9 and 10 are identified by the same reference numerals, and their description will be omitted.

The power supply circuit of FIG. 15 has the following configuration on the secondary side.

A starting point of a secondary winding N2 of an insulating converter transformer PIT is connected to a node of an anode of a rectifier diode D01 and a cathode of a rectifier diode D02 via a series resonant capacitor Cs connected in series with the secondary winding N2, while an ending point of the secondary winding N2 is connected to a ground on the secondary side. A cathode of the rectifier diode D01 is connected to a positive electrode of a smoothing capacitor C0, and an anode of the rectifier diode D02 is connected to the secondary-side ground. A negative electrode of the smoothing capacitor C0 is connected to the secondary-side ground.

Such a connection forms a voltage doubler half-wave rectifier circuit comprising a set of the [secondary winding N2, series resonant capacitor Cs, rectifier diodes D01 and D02, and smoothing capacitor C0].

Capacitance of the series resonant capacitor Cs and leakage inductance L2 of the secondary winding N2 form a series resonant circuit that performs resonant operation in response to on/off operation of the rectifier diodes D01 and D02.

The capacitance of the series resonant capacitor Cs is selected so as to satisfy fo1≈fo2, where parallel resonance frequency of a parallel resonant circuit (N1 and Cr) on the primary side is fo1, and series resonance frequency of the series resonant circuit on the secondary side is fo2.

Thus, the power supply circuit of FIG. 15 is a "complex resonance type switching converter" provided with the parallel resonant circuit to convert switching operation into voltage resonance type operation on the primary side, and the series resonant circuit to provide current resonance operation on the secondary side.

Operation of the voltage doubler rectifier circuit comprising a set of the [secondary winding N2, series resonant capacitor Cs, rectifier diodes D01 and D02, and smoothing capacitor C0] is as follows, for example.

When switching output is obtained at a primary winding N1 as a result of switching operation on the primary side, the switching output is induced at the secondary winding N2. The voltage doubler rectifier circuit is supplied with an alternating voltage obtained in the secondary winding N2 to perform rectifying operation thereon.

In this case, during a period during which the rectifier diode D01 is turned off and the rectifier diode D02 is turned on, the voltage doubler rectifier circuit performs operation in subtractive polarity mode, in which polarity of the primary winding N1 and the secondary winding N2 is −M, and thereby stores a current rectified by the rectifier diode D02 in the series resonant capacitor Cs.

During a period during which the rectifier diode D02 is turned off and the rectifier diode D01 is turned on, the voltage doubler rectifier circuit performs operation in additive polarity mode, in which polarity of the primary winding N1 and the secondary winding N2 is +M, and thereby stores in the smoothing capacitor C0 a current obtained by adding potential of the series resonant capacitor Cs to the voltage induced in the secondary winding N2.

The rectifying operations in subtractive polarity mode and additive polarity mode described above are alternately repeated as the secondary-side series resonant circuit performs series resonant operation on the secondary side of the insulating converter transformer PIT. As a result, the smoothing capacitor C0 obtains a secondary-side direct-current output voltage E0 that has a level substantially twice that of the voltage induced in the secondary winding N2.

Since in this case, the secondary-side direct-current output voltage E0 is obtained by the operation of the voltage doubler rectifier circuit, the number of turns of the secondary winding N2 needs to be only about ½ of that in a configuration having for example an equal-voltage rectifier circuit on the secondary side.

Also in this case, the secondary-side direct-current output voltage E0 is fed back to an oscillating circuit 41 in a switching driver 10B on the primary side via a photocoupler 40, and on the basis of the fed-back secondary-side direct-current output voltage E0, constant-voltage operation by the complex control method is obtained on the primary side.

Next, FIG. 16 shows another example of a complex resonance type switching converter provided with a series resonant circuit on the secondary side. As in the case of the power supply circuit shown in FIG. 10, the power supply circuit of FIG. 16 is provided with a self-excited voltage resonance type converter that performs single-ended operation on the primary side.

Also in this case, a series resonant capacitor Cs is connected in series with a starting point of a secondary winding N2 on the secondary side of the power supply circuit to form a secondary-side series resonant circuit. The power supply circuit in this case is provided with a bridge rectifier circuit DBR as a secondary-side rectifier circuit. The starting point of the secondary winding N2 is connected to a positive electrode input terminal of the bridge rectifier circuit DBR via the series resonant capacitor Cs, and a ending point of the secondary winding N2 is connected to a negative electrode input terminal of the bridge rectifier circuit DBR. In this circuit configuration, an alternating voltage obtained in the secondary winding N2, that is, resonance output of the secondary-side series resonant circuit is subjected to full-wave rectification by the bridge rectifier circuit DBR, and then stored in a smoothing capacitor C0, whereby a secondary-side direct-current output voltage E0 is obtained.

Also in this case, the secondary-side direct-current output voltage E0 is inputted from a branch point to a control circuit 1, and the control circuit 1 uses the inputted direct-current output voltage E0 as a detection voltage for constant-voltage control.

FIGS. 17A to 17F are waveform diagrams showing operation of the power supply circuits shown in FIGS. 15 and 16. FIGS. 17A, 17B, and 17C each show operation of the power supply circuits at an alternating-current input voltage VAC=100 V and a maximum load power Pomax=200 W. FIGS. 17D, 17E, and 17F each show operation of the power supply circuits at an alternating-current input voltage VAC=100 V and a minimum load power Pomin=0 W, or no load.

As shown in FIGS. 17A and 17D, a parallel resonance voltage V1 obtained across the parallel resonant capacitor Cr by switching operation of a switching device Q1 forms a sinusoidal resonance pulse waveform during a period TOFF. In the case of the complex resonance type converter having a parallel resonant circuit as a secondary-side resonant circuit, the period TOFF during which the switching device Q1 is turned off is changed, as shown in the figures.

Waveforms of FIGS. 17A and 17D show that also in this case, switching frequency fs is controlled so as to rise as load power Po is decreased. Also, the switching frequency fs (switching cycle) is changed by varying a period TON during which the switching device Q1 is turned on within one switching cycle.

The circuits formed as shown in FIGS. 15 and 16 have a tendency to raise the level of the parallel resonance voltage V1 as the load power becomes heavier. In this case, the parallel resonance voltage V1 is 580 Vp at a maximum load power Pomax=200 W, whereas the parallel resonance voltage V1 is 380 Vp at a minimum load power Pomin=0 W.

As shown in FIGS. 17B and 17E, a switching output current IQ1 flowing through a drain or a collector of the switching device Q1 is in synchronism with timing of the periods TOFF and TON, and forms substantially the same waveform pattern as that shown in FIGS. 13B and 13E. Specifically, the switching output current IQ1 is at a zero level during the period TOFF, and the switching output current IQ1 flows in a manner shown by the waveforms of FIGS. 17B and 17E during the period TON. Also in the case of this circuit configuration, the switching output current IQ1 has a tendency to increase as the load power Po becomes heavier. In this case, the switching output current IQ1 is 3.6 A at a maximum load power Pomax=200 W, whereas the switching output current IQ1 is 0.3 A at a minimum load power Pomin=0 W.

Operation on the secondary side is shown as a voltage V1 across the secondary winding N2 in FIGS. 13C and 13F. According to the figures, the voltage provides a rectangular pulse clamped at the level of the secondary-side direct-current output voltage E0 during the period DON at a maximum load power Pomax=200 W, while at a minimum load power Pomin=0 W, the voltage provides a sine wave having a switching cycle of the primary side, whose peak level is clamped at the level of the secondary-side direct-current output voltage E0.

As characteristics of the power supply circuits shown in FIGS. 15 and 16, FIG. 18 shows characteristics of variations in the switching frequency fs, the period TOFF and the period TON within a switching cycle, and the parallel resonance voltage V1 with respect to alternating-current input voltage VAC at a maximum load power Pomax=200 W.

FIG. 18 shows that the switching frequency fs is changed within a range of fs=110 KHz to 160 KHz for the alternating-current input voltage VAC=90 V to 140 V. This indicates an operation of stabilizing variation in the secondary-side direct-current output voltage E0 according to variation in direct-current input voltage. Also in this case, the switching frequency is controlled so as to rise as the level of the alternating-current input voltage VAC is increased.

Under conditions of a constant load, for example, the period TOFF within one switching cycle is constant, as contrasted with the switching frequency fs, whereas the period TON within one switching cycle is reduced as the switching frequency fs is increased. This also indicates an operation for controlling the switching frequency by the complex control method.

As shown in FIG. 18, in this case, the parallel resonance voltage V1 changed according to variation in commercial alternating-current power VAC is lowered within a level range around 600 V as the alternating-current input voltage VAC is increased within a range of the alternating-current input voltage VAC=80 to 100 V, and the parallel resonance voltage V1 is raised for the alternating-current input voltage VAC=100 V or higher.

The power supply circuit s shown in FIGS. 9, 10, 15, and 16 have the following problems.

The externally excited voltage resonance type converter employing the complex control method as a constant-voltage control method, as shown in FIGS. 9 and 15, uses a variation component in the level of the secondary-side direct-current output voltage E0 to control the switching frequency on the primary side, and therefore, in practice, the level of the secondary-side direct-current output voltage E0 is detected and amplified on the secondary side and then the result is supplied to the switching driver on the primary side, for example. Also, in this case, it is necessary to insulate the primary side from the secondary side by providing a photocoupler or the like between the primary side and the secondary side. In addition, the peak value of the parallel resonance voltage on the primary side is detected for conduction angle control of the primary-side voltage resonance type converter. Such a configuration renders an actual power supply circuit complex and large.

In the case of the self-excited voltage resonance type converter employing the complex control method as shown in FIGS. 10 and 16, it is necessary to provide insulation distance between the current detecting winding ND, the driving winding NB, and the cores provided in the orthogonal type control transformer PRT, which is required for constant-voltage control. This makes it difficult to design and manufacture the orthogonal type control transformer PRT and also hinders miniaturization of the orthogonal type control transformer PRT.

Since in the circuits of FIGS. 9 and 10 provided with a secondary-side parallel resonant circuit, the voltage Vo across the secondary winding N2 rises to about 450 Vp at the maximum, components having a withstand voltage of about 600 V, for example, are to be selected as the secondary-side parallel resonant capacitor C2 and the rectifier diode D0.

As the level of withstand voltage of these components is lowered, for example, the components are reduced in size and the switching characteristics of switching components such as rectifier diodes are enhanced, thereby leading to a reduction of switching loss, for example. Therefore, if the withstand voltage of the components can be lowered for example by controlling the level of voltage generated on the secondary side, the switching characteristics of the components will be improved. This means an improvement in the characteristics of the power supply circuit.

Moreover, as shown in FIGS. 13C and 13F, in the circuits of FIGS. 9 and 10, high-frequency ringing occurs in the rectified current I0 on the secondary side when the rectifier diode D0 is turned on, thereby emitting noise. Therefore, in practice, as shown on the secondary side of the circuit of FIG. 10, the power supply circuit needs to be provided with a snubber circuit comprising a capacitor Csn and a resistance Rsn in parallel with the rectifier diode D0, for example. However, provision of the snubber circuit will result in an increase in power loss.

Also, it is known that while the circuits of FIGS. 15 and 16 provided with a series resonant circuit on the secondary side variably controls switching frequency according to variation in the secondary-side direct-current output voltage E0 due to load variation to effect constant-voltage control, an abnormal operation in which ZVS (Zero Voltage Switching) is not performed occurs under conditions of medium load.

Such abnormal operation occurs in the power supply circuit of FIG. 10 because the period TOFF during which the switching device Q1 is turned off is extended as the load power Po is decreased and the switching frequency is increased. During a period Ti during which such abnormal operation occurs, the switching device Q1 performs switching operation while having a certain level of voltage and current, and therefore power loss in the switching device Q1 is increased. Thus, it is necessary to enlarge a heat radiator for controlling heating of the switching device Q1.

In cases where the power supply circuit changes the switching frequency on the primary side and thus stabilizes the secondary-side direct-current output voltage by the complex control method, when an abnormal condition of a short circuit in the load on the secondary side occurs, the control system of the power supply circuit operates so as to lower the switching frequency. In a condition of a low switching frequency, the period TON during which the switching device is turned on is lengthened, and therefore the level of voltage (V1) and current (IQ1 and Icr) applied to the switching device Q1 and the parallel resonant capacitor Cr, for example, is increased.

Thus, in order to deal with a short-circuited load, it is necessary to provide the power supply circuit with an overvoltage protective circuit and an overcurrent protective circuit for protecting the switching device by limiting a high level of voltage and current generated at the time of the short circuit. Provision of the overvoltage protective circuit and the overcurrent protective circuit also hinders reduction of size and cost of the power supply circuit.

SUMMARY OF THE INVENTION

It is therefore an object of the present invention to provide a switching power supply circuit which is improved in its power conversion efficiency and is miniaturized.

In carrying out the invention and according to one aspect thereof, there is provided a switching power supply circuit comprising: an insulating converter transformer including a primary winding and a secondary winding insulated from each other, the primary winding and the secondary winding being loosely coupled to each other; a switching circuit including a switching device for performing switching operation on a current flowing into the primary winding of the insulating converter transformer at a fixed frequency; a primary-side parallel resonant capacitor provided on a primary side of the insulating converter transformer for forming a primary-side parallel resonant circuit in conjunction with inductance of the converter transformer; a secondary-side resonant capacitor provided on a secondary side of the insulating converter transformer for forming a secondary-side resonant circuit in conjunction with inductance of the converter transformer; a rectifier circuit for rectifying an alternating voltage obtained on the secondary side of the insulating converter transformer; an active clamp circuit provided on the secondary side of the insulating converter transformer for clamping the alternating voltage obtained on the secondary side of the insulating converter transformer in synchronism with the switching operation of the switching circuit; and a constant-voltage control circuit for effecting control for constant voltage by controlling a clamping period of the active clamp circuit and controlling an on/off-period duty ratio of a rectifying device of the rectifier circuit according to a level of output voltage of the rectifier circuit.

The configuration described above is that of a so-called complex resonance type switching converter provided with a primary-side parallel resonant circuit for forming a voltage resonance type converter on the primary side and a secondary-side resonant circuit formed by a secondary winding and a secondary-side resonant capacitor on the secondary side. The switching frequency of the voltage resonance type converter on the primary side is fixed at a given frequency.

On the basis of this configuration, an active clamp means for controlling a level of voltage obtained in the secondary winding is provided on the secondary side. Control for constant voltage is effected by allowing switching frequency to be dependent on the primary-side switching converter and therefore to be constant, and by variably controlling an on/off-period duty ratio of a secondary-side rectifier diode.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A to 2L are waveform diagrams showing operation (at a maximum load power) of main parts in the switching power supply circuit of the first embodiment.

FIGS. 3A to 3L are waveform diagrams showing operation (at a minimum load power) of main parts in the switching power supply circuit of the first embodiment.

FIGS. 13A to 13F are waveform diagrams showing operation of the switching power supply circuit shown in FIGS. 10 and 11.

FIG. 18 is a schematic diagram in illustrating characteristics of the switching power supply circuit shown in FIGS. 15 and 16 with respect to alternating input voltage.

DETAILED DESCRIPTION OF THE PREFERRED EMBODIMENTS

Figure 1:
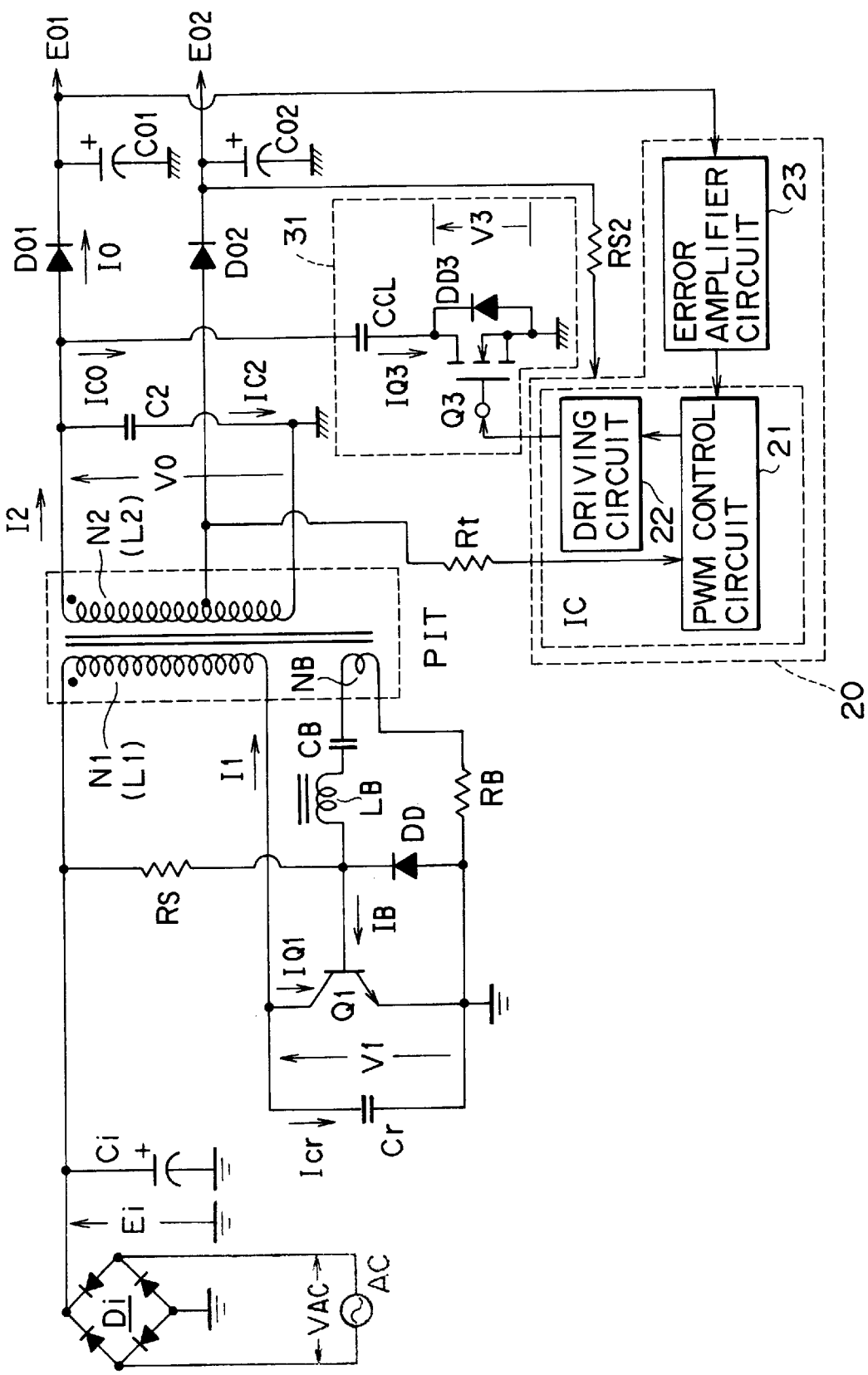
FIG. 1 is a circuit configuration diagram of a switching power supply circuit according to a first embodiment of the present invention.

FIG. 1 is a circuit configuration diagram of a power supply circuit according to a first embodiment of the present invention. The power supply circuit shown in FIG. 1 is a complex resonance type converter provided with a self-excited voltage resonance type converter on the primary side and a series resonant circuit on the secondary side.

In the figure, the same parts as in FIGS. 9, 10, 15, and 16 are identified by the same reference numerals, and their description will be omitted.

Figure 10:
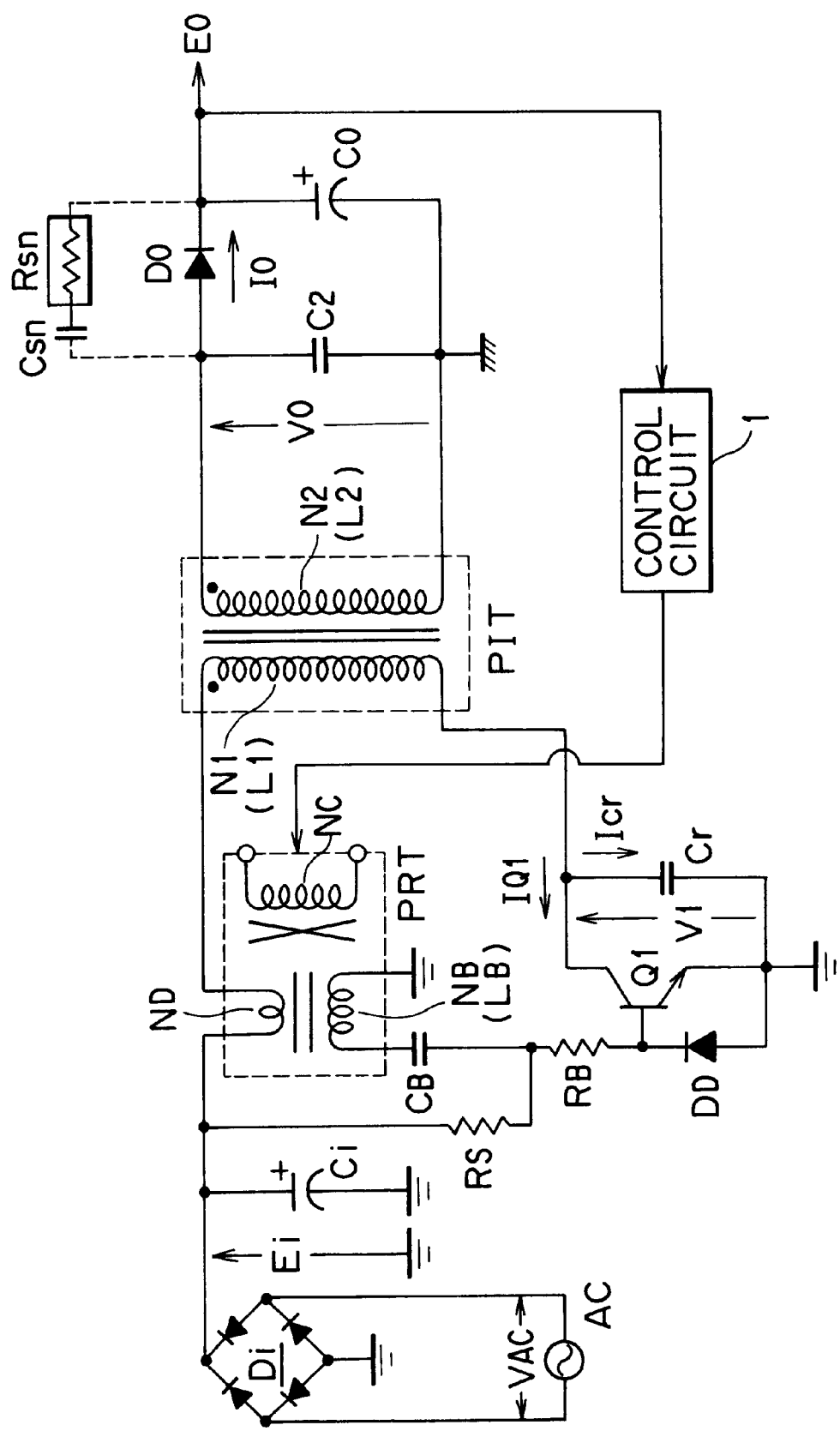
FIG. 10 is a circuit diagram showing another configuration example of a prior art switching power supply circuit.
Figure 11:
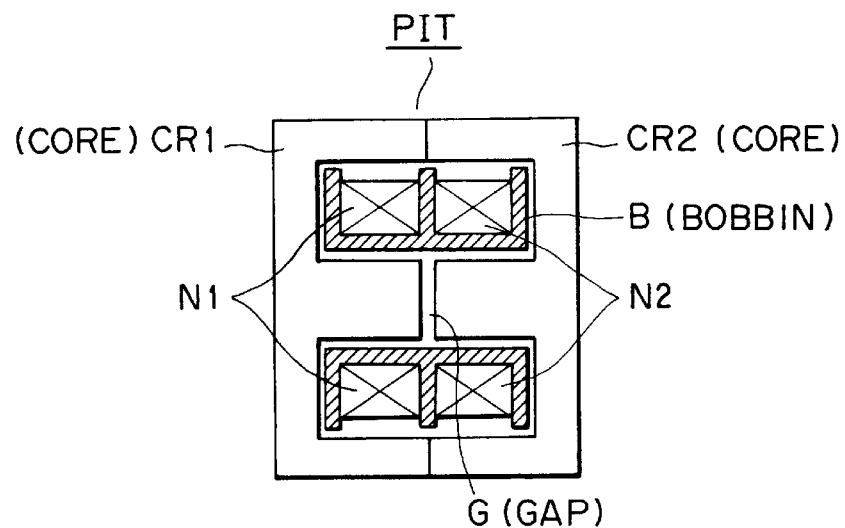
FIG. 11 is a sectional view of an insulating converter transformer.
Figure 12A:
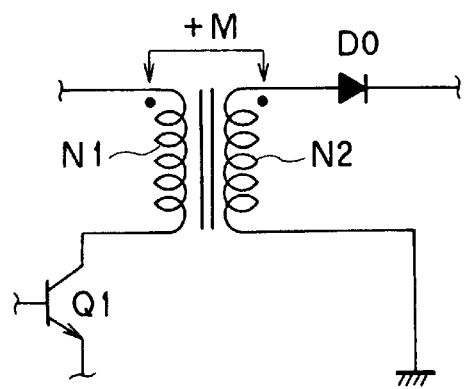
FIGS. 12A and 12B are equivalent circuit diagrams of assistance in explaining operations when mutual inductance is +M and −M.
Figure 12B:
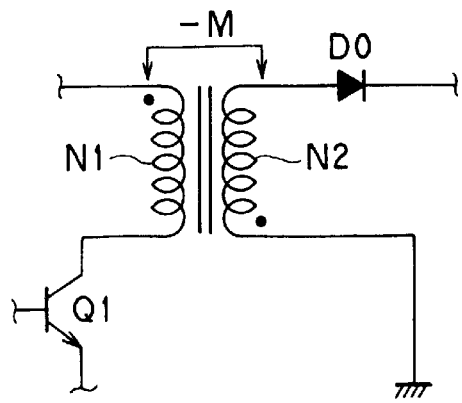
Figure 14:
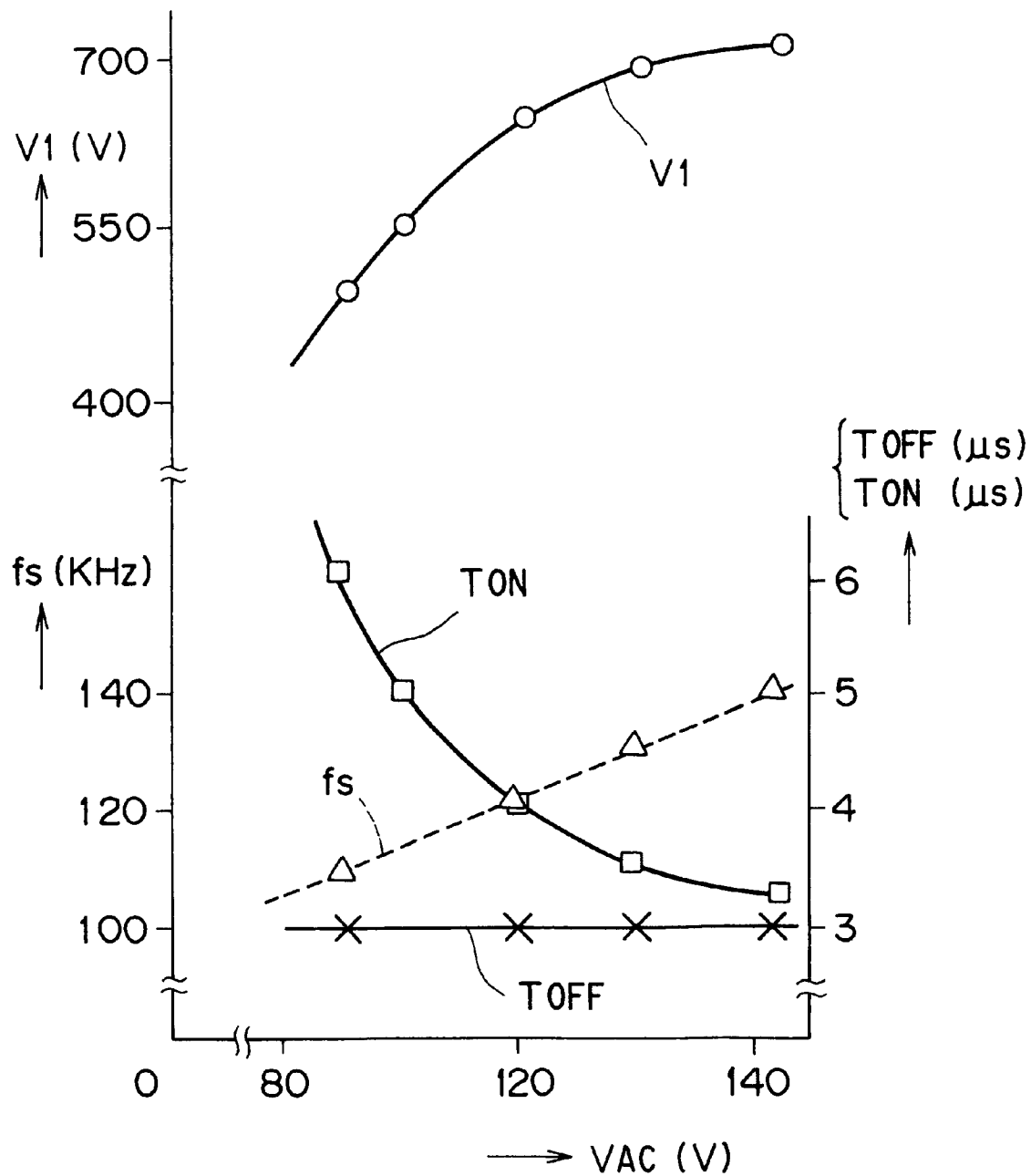
FIG. 14 is a schematic diagram in illustrating characteristics of the switching power supply circuit shown in FIGS. 10 and 11 with respect to alternating input voltage.
Figure 15:
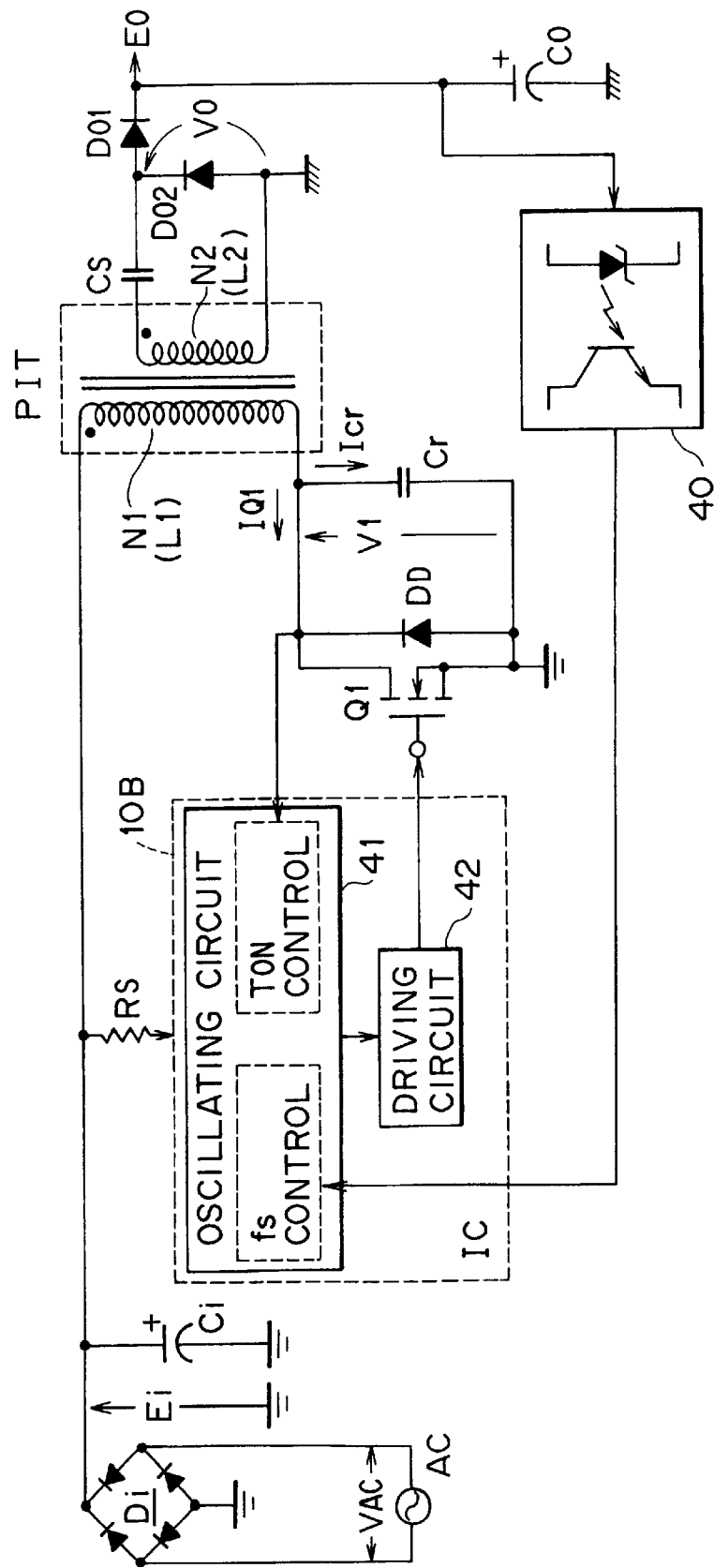
FIG. 15 is a circuit diagram showing a further configuration example of a prior art switching power supply circuit.
Figure 16:
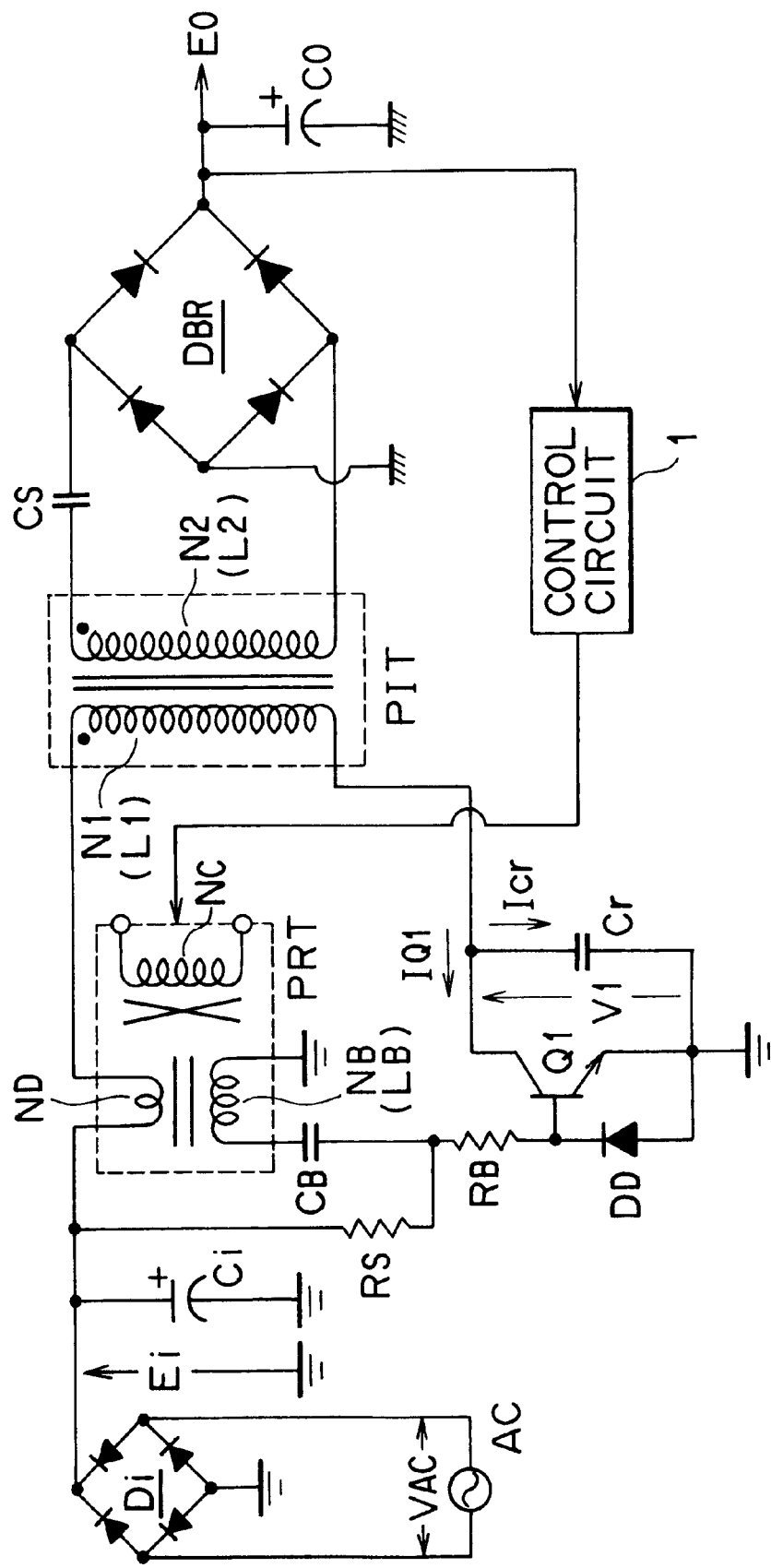
FIG. 16 is a circuit diagram showing a further configuration example of a prior art switching power supply circuit.
Figure 17:
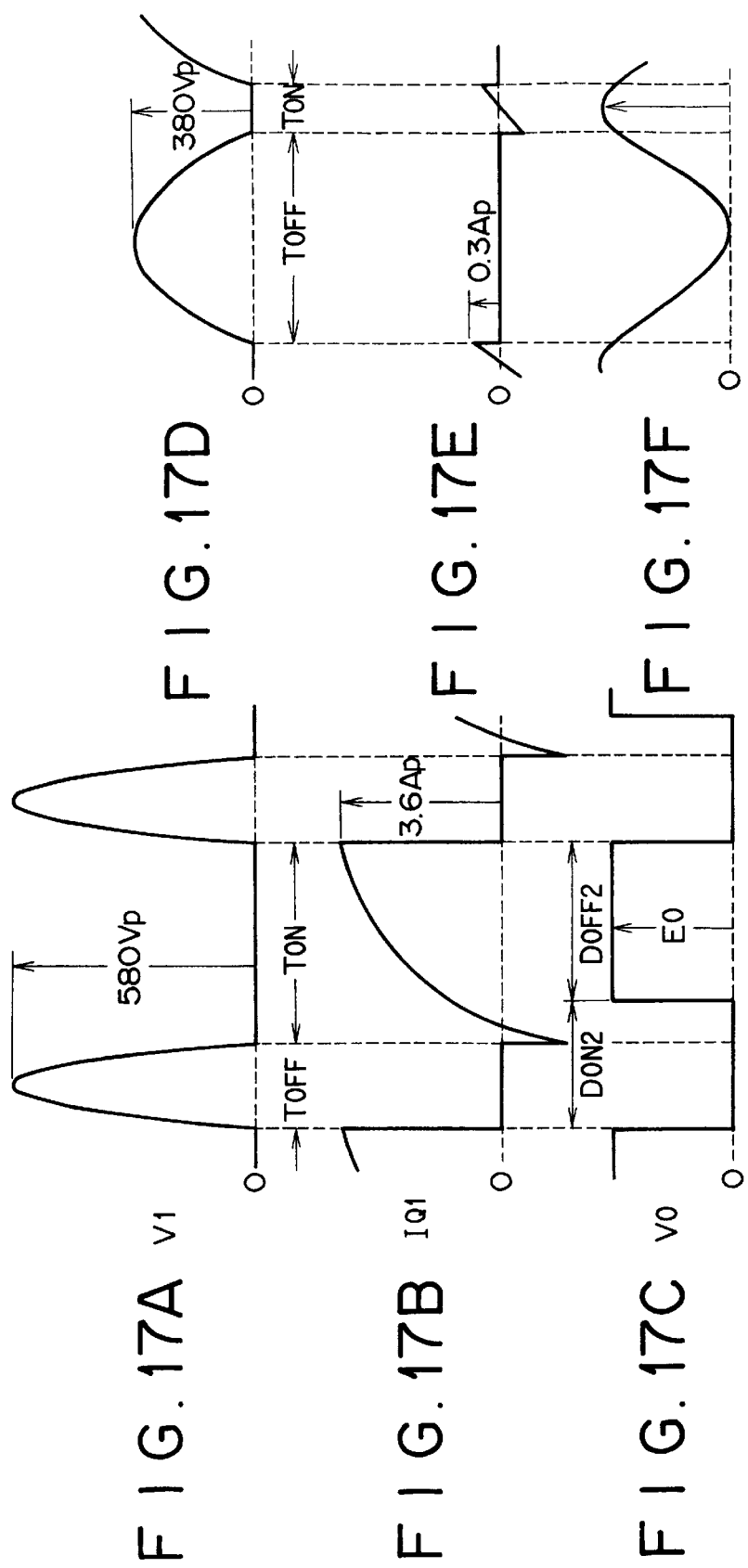
FIGS. 17A to 17F are waveform diagrams showing operation of the switching power supply circuit shown in FIGS. 15 and 16.

An orthogonal type control transformer PRT as provided in the power supply circuit shown in FIG. 10 for example is omitted on the primary side of the circuit of FIG. 1. In this case, a driving winding NB that forms a self-oscillation driving circuit of the primary-side voltage resonance type converter is wound on the primary side of an insulating converter transformer PIT separately from a primary winding N1, for example.

With such a configuration, a switching device Q1 performs switching operation at a switching frequency that is determined and fixed by a resonance frequency of a series resonant circuit (NB and CB) in the self-oscillation driving circuit.

A parallel resonant circuit formed by a secondary winding N2 and a parallel resonant capacitor C2 is provided on the secondary side of the power supply circuit. Thus, together with the primary-side voltage resonance type converter, the power supply circuit as a whole forms a complex resonance type switching converter.

In this case, a half-wave rectifier circuit formed by a rectifier diode D01 and a smoothing capacitor C01 is connected to a starting point of the secondary winding N2 to provide a secondary-side direct-current output voltage E01. The secondary-side direct-current output voltage E01 is also supplied from a branch point to an error amplifier circuit 23, which will be described later, to thereby stabilize output on the secondary side.

Moreover, in this case, the secondary winding N2 is provided with a tap, and a half-wave rectifier circuit comprising a rectifier diode D02 and a smoothing capacitor C02, which forms a path of rectified current between the tap terminal of the secondary winding N2 and a secondary-side ground, is connected to the tap, whereby a low secondary-side direct-current output voltage E02 is obtained.

Furthermore, a secondary-side active clamp circuit 31 and a secondary-side switching driver 20 for driving the secondary-side active clamp circuit 31 are provided on the secondary side of the power supply circuit.

The secondary-side active clamp circuit 31 in this case is provided with an auxiliary switching device Q3 formed by a MOS-FET. A clamp diode DD3 is connected across a drain and source of the auxiliary switching device Q3, as shown in FIG. 1. The drain of the auxiliary switching device Q3 is connected to the starting point of the secondary winding N2 via a clamp capacitor CCL.

Thus, the secondary-side active clamp circuit 31 is formed by connecting the clamp capacitor CCL in series with a parallel connection circuit of the auxiliary switching device Q3 and the clamp diode DD3. The circuit thus formed is connected in parallel with the secondary winding N2.

The secondary-side switching driver 20 is formed by a PWM control circuit 21, a driving circuit 22, and an error amplifier circuit 23, for example, as shown in FIG. 1. Of these functional circuits, the PWM control circuit 21 and the driving circuit 22 can be formed by a single IC. The PWM control circuit 21 and the driving circuit 22 formed by the s ingle IC starts operation by being supplied with the secondary-side direct-current output voltage E02 via a starting resistance Rs2 at the start of power supply.

The error amplifier circuit 23 outputs to the PWM control circuit 21 a voltage or a current whose level corresponds to variation in the inputted secondary-side direct-current output voltage E01.

An alternating voltage obtained at the tap output terminal of the secondary winding N2 is inputted to the PWM control circuit 21 as a source signal via a detecting resistance Rt. The source signal is the alternating voltage induced at the secondary winding N2 by the primary winding N1, and therefore, its frequency coincides with the switching frequency on the primary side.

On the basis of the inputted alternating voltage of the secondary winding, the error amplifier circuit 23 outputs a PWM signal of 100 KHz that is in synchronism with the switching frequency on the primary side. Duty ratio of the PWM signal is changed according to the level of a voltage or a current inputted from the error amplifier circuit 23. The duty ratio changed according to the voltage level or the current level corresponds to a duty ratio between an on period and an off period within one switching cycle of the auxiliary switching device Q3. The PWM control circuit 21 outputs the PWM signal to the driving circuit 22.

The driving circuit 22 generates a driving voltage on the basis of the waveform of the PWM signal outputted from the PWM control circuit 21, and applies the driving voltage to a gate of the auxiliary switching device Q3. Thus, the auxiliary switching device Q3 performs switching operation while its duty ratio between an on period and an off period is variably controlled by the PWM control circuit 21. In other words, the auxiliary switching device Q3 performs switching operation while its switching frequency is fixed and its on period (conduction angle) is variably controlled.

FIGS. 2A to 2L are waveform diagrams showing operation of the power supply circuit of FIG. 1. The figures show operation of the power supply circuit at AC 100 V and a maximum load power Pomax=200 W. Operation of the secondary-side active clamp circuit 31 mentioned above will be explained in the course of description with reference to the figures.

A parallel resonance voltage V1 of FIG. 2A has a waveform corresponding to switching timing of the switching device Q1 of the primary-side voltage resonance type converter. Specifically, the parallel resonance voltage V1 provides a voltage resonance pulse during a period TOFF during which the switching device Q1 is turned off, while the parallel resonance voltage V1 has a waveform maintained at a zero level during a period TON during which the switching device Q1 is turned on.

As for a current IQ1 flowing through the switching device Q1 at this point, a clamp current of negative polarity first flows through a clamp diode DD at the start of the period TON, and thereafter the current IQ1 rises to a positive level, as shown in FIG. 2B.

A base current flowing from the self-oscillation driving circuit to a base of the switching device Q1 driven by the self-oscillation has a waveform as shown in FIG. 2C.

FIG. 2D shows a parallel resonance current Icr flowing through the parallel resonant capacitor C2. Thus, resonance waveforms for one cycle are obtained by resonance effects in the period TOFF.

A switching output current I1 obtained at the primary winding N1 by such switching operation on the primary side is shown in FIG. 2E.

The operation of the secondary-side active clamp circuit 31 is divided into five operation modes ① To ⑤ shown in FIGS. 2F to 2L. The operation modes ① to ⑤ comprise operation within one switching cycle.

Operation in mode ① is performed during a period Don during which the rectifier diode D01 is turned on. As is understood from FIG. 2G, in which a switching voltage V3 has a waveform on a positive level, the auxiliary switching device Q3 is in an off state during the period Don. In this case, a rectified current I0 in the rectifier diode D01 flows in a manner as shown in FIG. 2L via leakage inductance of the secondary winding N2.

During the period Don in mode ① a secondary winding voltage Vo, which is the alternating voltage across the secondary winding N2, is clamped at a level of the secondary-side direct-current output voltage E01, as shown in FIG. 2F.

Then, the rectifier diode D01 is turned off, whereby mode ① is ended. Operation in mode ② is obtained during the next period td3.

During the period td3 in mode ②, a current that has been flowing from the secondary winding N2 to the rectifier diode D01 is reversed in direction, and the current flows through the parallel resonant capacitor C2 as a current IC2 in a manner shown in FIG. 2I.

After the period td3 in mode ② has passed, operation in mode ③ begins at the start of the first half of a period Ton3. As shown in FIG. 2F, the secondary winding voltage Vo obtained at the secondary winding N2 reaches a level substantially equal to or higher than that of an initial voltage of the smoothing capacitor C01 during the period in mode ③. Thus, the clamp diode DD3 connected in parallel with the auxiliary switching device Q3 conducts, whereby a current flows through the clamp capacitor CCL. This current is shown as a current Ico in FIG. 2J in the first half of the period Ton3.

Since capacitance of the clamp capacitor CCL is set to be 25 times or more that of the parallel resonant capacitor C2, for example, most of the current I2 flowing through the secondary winding N2 (FIG. 2H) can be made to flow through the clamp capacitor CCL during the operation in mode ③. Thus, the secondary winding voltage Vo shown in FIG. 2F has a waveform with a small gradient, and accordingly its peak level is controlled.

When the foregoing first half of the period Ton3 ends and the second half of the period Ton3 begins, the operation is shifted from mode ③ to mode ④.

During the period in mode ④, the auxiliary switching device Q3 is turned into an on state. In this state, a current flows through the auxiliary switching device Q3, as indicated by the current Ico of FIG. 2J and a switching output current IQ3 of the auxiliary switching device Q3 of FIG. 2K in the second half of the period Ton3. In this case, a path of current from the secondary winding N2 to the clamp capacitor CCL and to the auxiliary switching device Q3 is formed, with a resonance effect produced by the secondary winding N2 and the clamp capacitor CCL. The current flowing in such a manner allows the secondary winding voltage Vo shown in FIG. 2F to have a waveform with a small gradient also in the second half of the period Ton3.

The operations in modes ③ and ④ during the period Ton3 described above in effect clamp the peak level of the secondary winding voltage Vo shown in FIG. 2F. While the secondary winding voltage of the prior art power supply circuits shown earlier in other figures is about 440 V, for example, the circuit shown in FIG. 1 in effect controls the secondary winding voltage to as low as 220 V.

After the operation in mode ④ in the period Ton3 is ended, the auxiliary switching device Q3 is turned off, whereby the operation is shifted to mode ⑤ in a period td4. Since the auxiliary switching device Q3 is turned off in mode ⑤, a current of positive polarity flowing in the secondary winding N2 flows through the parallel resonant capacitor C2, as indicated by IC2 of FIG. 2I. At this point, the secondary winding voltage Vo rises to a zero level with a steep gradient, because the parallel resonant capacitor C2 has a small capacitance.

Thereafter, the operations in modes ① to ⑤ are repeated for each switching cycle.

The rectifier diode D01 performs ZVS during the period td 3 in mode ② and the period td4 in mode ⑤, for example.

As is understood from timing of the switching current IQ3 shown in FIG. 2K, the waveform of the switching voltage V3 shown in FIG. 2G, and the waveform of the secondary winding voltage Vo of FIG. 2F, the auxiliary switching device Q3 is turned on by ZVS and ZCS (Zero Cross Switching) using the period of mode ② (td3) while the rectifier diode D01 is turned on and thereby in a conducting state. The turning off of the auxiliary switching device Q3 begins at the start of mode ⑤. At this point, the secondary winding voltage Vo of FIG. 2F rises with a certain gradient as described above, whereby turn-off operation by ZVS is obtained.

FIGS. 3A to 3L show operation waveforms of the parts shown in FIGS. 2A to 2L respectively at a minimum load power Pomin=20 W.

A comparison of the parallel resonance voltage V1 of FIG. 3A with that of FIG. 2A indicates that the switching frequency and the duty ratio of an on/off period within one switching cycle of the primary-side voltage resonance type converter are the same and unchanged irrespective of variation in load power.

On the other hand, as shown for example by the operation waveforms of the secondary-side parts of FIGS. 3F to 3L, the switching frequency on the secondary side is dependent on the primary-side switching converter and therefore is fixed at the same frequency, but the duty ratio of an on/off period within one switching cycle on the secondary side is changed.

This is because PWM control of the waveform of a driving signal for driving the auxiliary switching device Q3 is effected according to change in the secondary-side direct-current output voltage E01 due to load variation. Specifically, as is understood from the waveforms of FIGS. 3F to 3L, the power supply circuit of the present embodiment variably controls the on period (Ton3) of the auxiliary switching device Q3 of the secondary-side active clamp circuit 31 according to change in the secondary-side direct-current output voltage. The switching frequency of the rectifier circuit system on the secondary side is dependent on the switching frequency on the primary side, as described above, and therefore is the same as the switching frequency of the primary-side switching converter. This means that the switching frequency of the rectifier circuit system on the secondary side is fixed irrespective of load variation. Therefore, as the on period (Ton3) of the auxiliary switching device Q3 on the secondary side is variably controlled as described above, the conduction angle of the rectifier diode D01 on the secondary side is also variably controlled. Thus, the level of the secondary-side direct-current output voltage E01 is also variably controlled and thereby stabilized.

For example, in practice, PWM control of the auxiliary switching device Q3 is effected in such a way that its duty ratio satisfies the following equation:

Ton3/(Don+Ton3)=0.4 to 0.9

Under conditions of light load as shown in FIGS. 3A to 3L, for example, the operations in modes ① to ⑤ on the secondary side are also performed in one switching cycle as indicated in the figures to thereby clamp the secondary winding voltage Vo.

As is understood from the above description with reference to FIGS. 2A to 2L and FIGS. 3A to 3L, the active clamp circuit 31 provided on the secondary side of the power supply circuit of FIG. 1 clamps and thereby controls the alternating voltage (secondary winding voltage Vo) obtained at the secondary winding N2.

Figure 9:
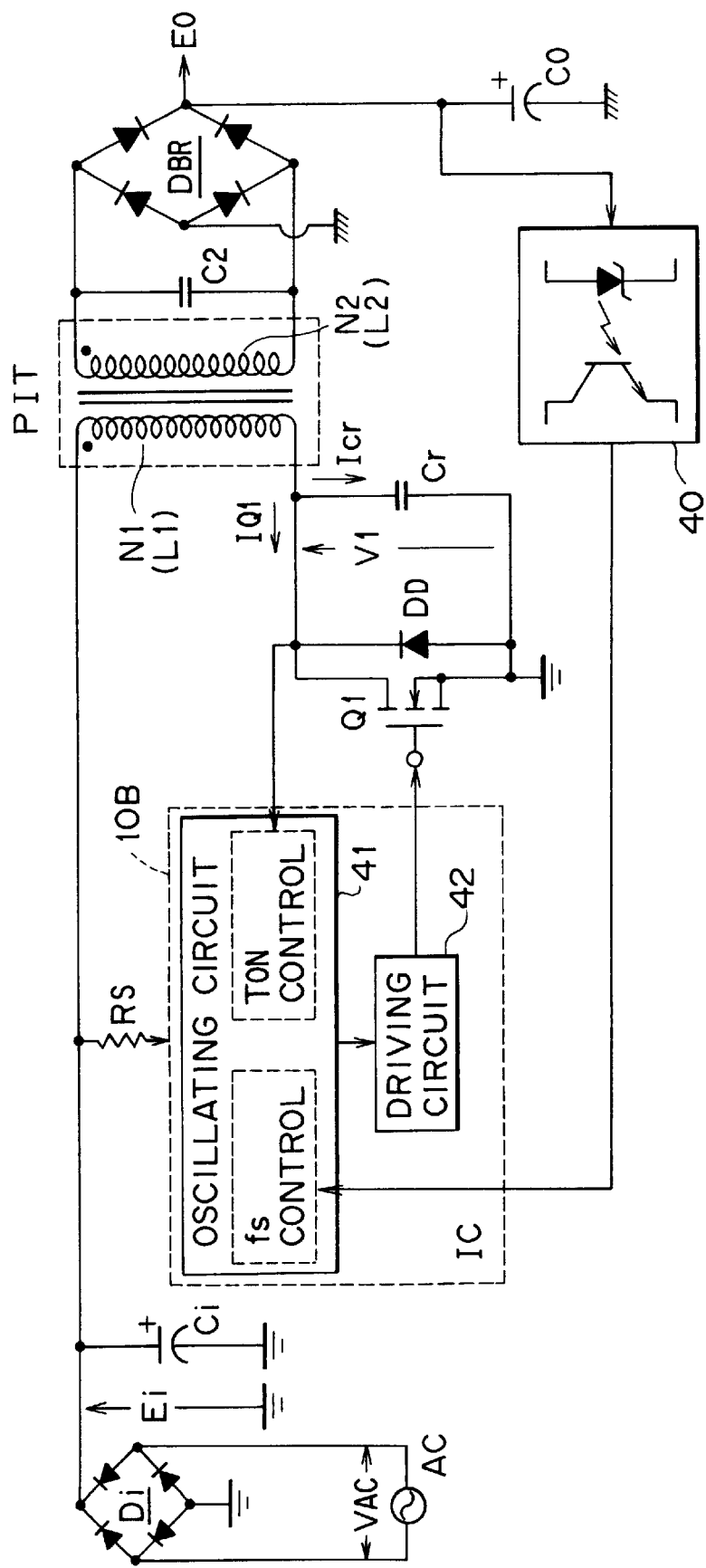
FIG. 9 is a circuit diagram showing a configuration example of a prior art switching power supply circuit.

For example, while the secondary winding voltage Vo obtained in the circuits shown in FIGS. 9 and 10 is 450 Vp at a maximum load power, the present embodiment controls the secondary winding voltage Vo to as low as 220 Vp, which is about ½ of the secondary winding voltage Vo of the circuits of FIGS. 9 and 10. Therefore, it is possible to select a product having a low withstand voltage of 300 V as a rectifier diode D0 to be provided on the secondary side. In addition, as the level of the secondary winding voltage Vo is controlled, the level of the voltage V3 across the auxiliary switching device Q3 is also controlled to about 200 Vp, for example. Therefore, a product having a withstand voltage as low as that of the above product may be selected as the auxiliary switching device Q3.

Thus, the circuit shown in FIG. 1 is improved over the prior art power supply circuits shown in FIG. 9, FIG. 10, FIG. 15, and FIG. 16, for example, in terms of characteristics of the switching devices. For example, on resistance of the rectifier diode D0 and the auxiliary switching device Q3 is reduced, thereby improving power conversion efficiency.

For example, in practice, while power conversion efficiency in the circuits shown in FIGS. 9 and 10 is 92%, power conversion efficiency in the circuit shown in FIG. 1 is 93%, thereby making it possible to achieve a reduction of about 2.3 W in power loss. In addition, a product with a low withstand voltage may be selected as the secondary-side parallel resonant capacitor C2, to which the secondary winding voltage Vo is applied.

Since products with low withstand voltage are selected as the above-mentioned components, the components are reduced in size and cost, and therefore it is also possible to reduce size and cost of the power supply circuit.

As shown in FIGS. 2L and 3L, the ringing component of the circuit of FIG. 1, which is superimposed on the rectified current I0 flowing from the secondary winding N2 to the rectifier diode D0, is small as compared with the circuits of FIGS. 9 and 10, for example. This eliminates the need for providing a snubber circuit for the secondary-side rectifier diode D0 in the present embodiment, and thereby contributes to the reduction in power loss as mentioned above.

The self-excited voltage resonance type converter provided on the primary side of the circuit shown in FIG. 1 has a fixed switching frequency, and therefore an orthogonal type control transformer PRT is not provided in the circuit of FIG. 1. This makes it possible to reduce size of the circuit and simplify the process of manufacturing the circuit.

Moreover, the switching frequency on the primary side of the power supply circuit of FIG. 1 is fixed. Therefore, even if a load on the secondary side is short-circuited, the switching frequency will not be controlled to a low level, and thus a state of overcurrent or overvoltage will not occur, as distinct from the prior art circuits. Accordingly, this eliminates the need to provide a protective circuit for preventing the overcurrent or overvoltage in the power supply circuit of the present embodiment.

Values selected for main components in the power supply circuit of FIG. 1 in obtaining experimental results as shown in FIGS. 2A to 2L and FIGS. 3A to 3L are shown in the following for reference.

Figure 4:
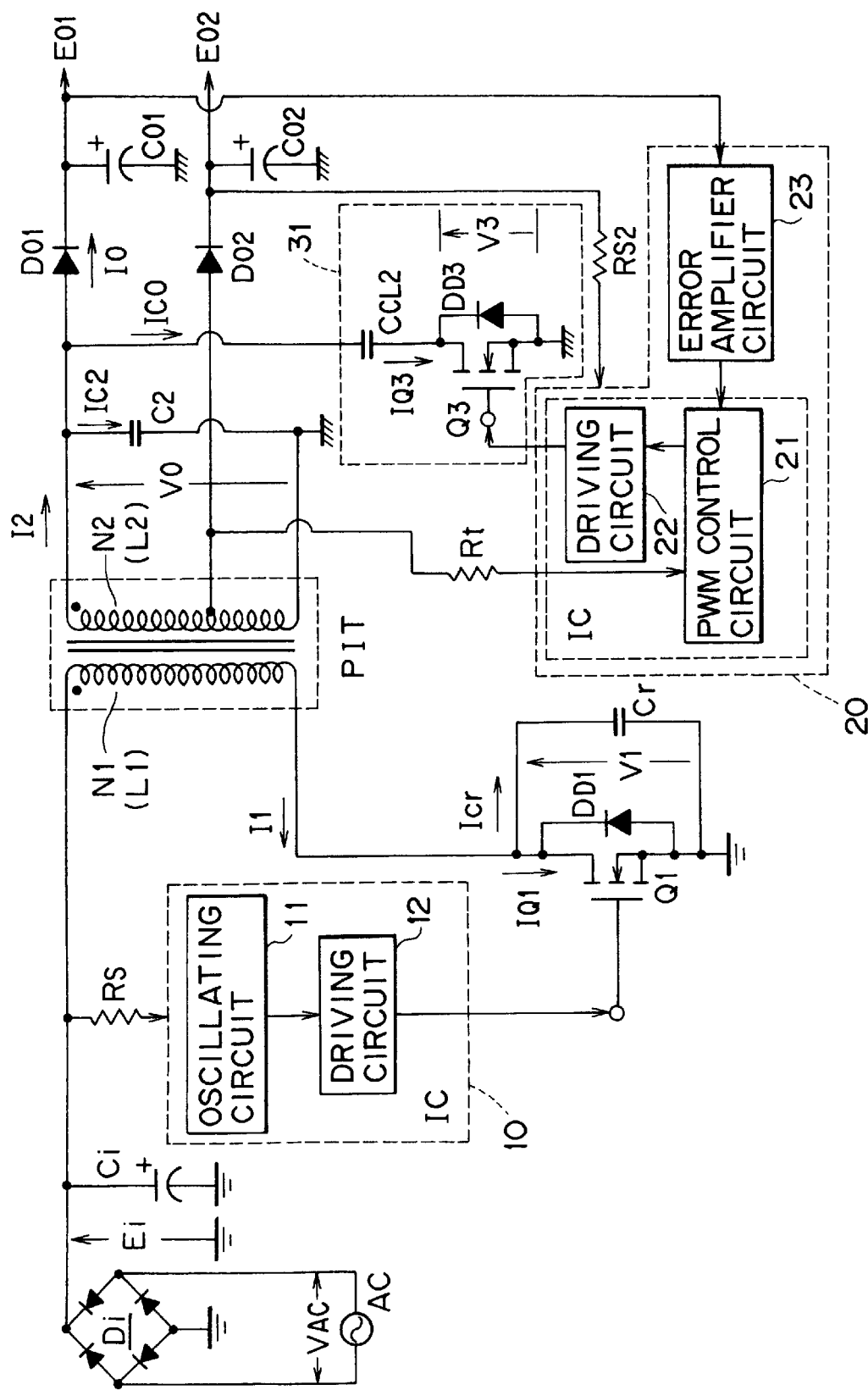
FIG. 4 is a circuit configuration diagram of a switching power supply circuit according to a second embodiment of the present invention.

Secondary winding N2=43 T
Secondary-side parallel resonant capacitor C2=0.01 $\mu$F
Clamp capacitor CCL=0.27 $\mu$F FIG. 4 shows a configuration of a power supply circuit according to a second embodiment of the present invention. The power supply circuit shown in FIG. 4 is a complex resonance type converter provided with a voltage resonance type converter on the primary side and a parallel resonant circuit on the secondary side.

In the figure, the same parts as in FIGS. 1, 9, 10, 15, and 16 are identified by the same reference numerals, and their description will be omitted.

An externally excited voltage resonance type converter employing a MOS-FET as a switching device Q1 is provided on the primary side of the power supply circuit of FIG. 4.

The switching device Q1 is driven for switching operation by a switching driving unit 10. The switching driving unit 10 comprises an oscillating circuit 11 and a driving circuit 12. The oscillating circuit 11 generates an oscillating signal having a frequency fixed at 100 KHz, for example, and outputs the oscillating signal to the driving circuit 12. On the basis of the oscillating signal, the driving circuit 12 generates a driving voltage for driving the switching device Q1, and outputs the driving voltage to the switching device Q1. Thus, the power supply circuit on the primary side performs switching operation as shown by waveforms of FIGS. 2A to 2E and FIGS. 3A to 3E, for example.

A configuration on the secondary side is the same as that of the power supply circuit of FIG. 1, and therefore its description will be omitted here. Control for constant voltage is effected by controlling the conduction angle of an auxiliary switching device Q3 forming a secondary-side active clamp circuit 31 according to variation in secondary-side direct-current output voltage E0.

Such a configuration also makes it possible to lower withstand voltage of a secondary-side rectifier diode D0, the auxiliary switching device Q3, and a secondary-side parallel resonant capacitor C2, and to omit a snubber circuit because of a reduction in a ringing component superimposed on a secondary-side rectified current I0.

In this case, the switching driving unit 10 for driving the primary-side voltage resonance type converter does not require a complex configuration for constant-voltage control. Also, a photocoupler for insulating the primary side from the secondary side is not required. Therefore, it is possible to simplify the driving circuit system of the voltage resonance type converter.

Figure 5:
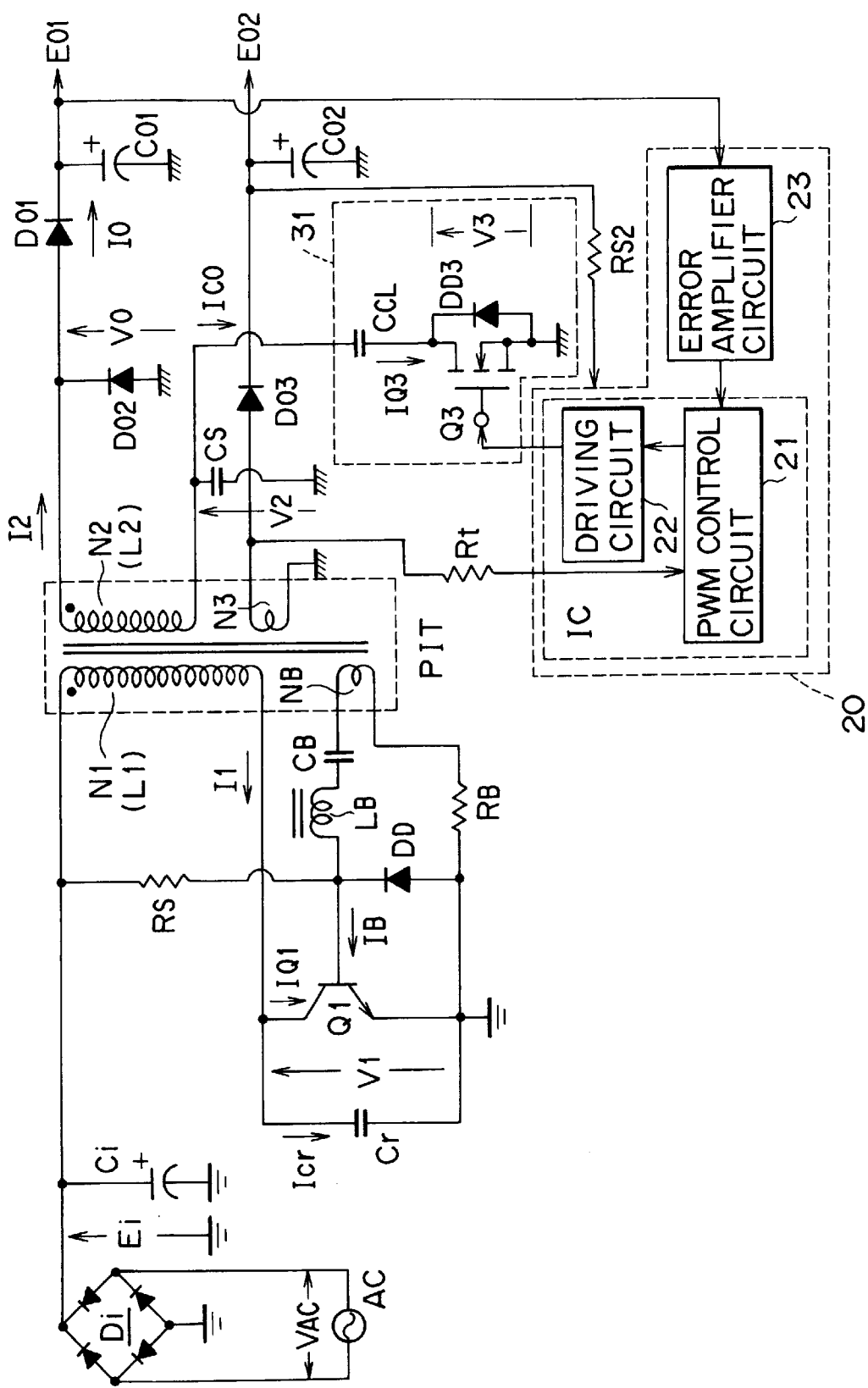
FIG. 5 is a circuit configuration diagram of a switching power supply circuit according to a third embodiment of the present invention.

FIG. 5 shows a configuration of a power supply circuit according to a third embodiment of the present invention. In the figure, the same parts as in FIGS. 1, 4, 9, 10, 15, and 16 are identified by the same reference numerals, and their description will be omitted.

A configuration on the primary side of the power supply circuit shown in FIG. 5 is the same as that on the primary side of the power supply circuit according to the first embodiment shown in FIG. 1.

Instead of a combination of the secondary-side parallel resonant circuit and the half-wave rectifier circuit formed on the secondary side of the power supply circuit of FIG. 1, a rectifier circuit system formed by connecting a secondary-side series resonant capacitor Cs, rectifier diodes D01 and D02, and a smoothing capacitor C01 in a manner as shown in FIG. 5 is provided on the secondary side of the power supply circuit of FIG. 5. The rectifier circuit system forms a voltage doubler rectifier circuit including a secondary-side series resonant circuit comprising the secondary-side series resonant capacitor Cs and a secondary winding N2.

In FIG. 5, a tertiary winding N3 is wound on the secondary side of an insulating converter transformer PIT, and a low secondary-side direct-current output voltage E02 is obtained by a half-wave rectifier circuit formed by a rectifier diode D03 and a smoothing capacitor C02 and connected to the tertiary winding N3. In this case, a source signal to be supplied to a PWM control circuit 21 is inputted from the tertiary winding N3 via a resistance Rt.

FIGS. 6A to 6K and FIGS. 7A to 7K are waveform diagrams showing operations of main parts in the thus configured power supply circuit of FIG. 5. FIGS. 6A to 6K show operations at a commercial alternating-current power AC 100 V and a maximum load power Pomax=200 W. FIGS. 7A to 7K show operations at a commercial alternating-current power AC 100 V and a maximum load power Pomin=20 W.

Figure 6:
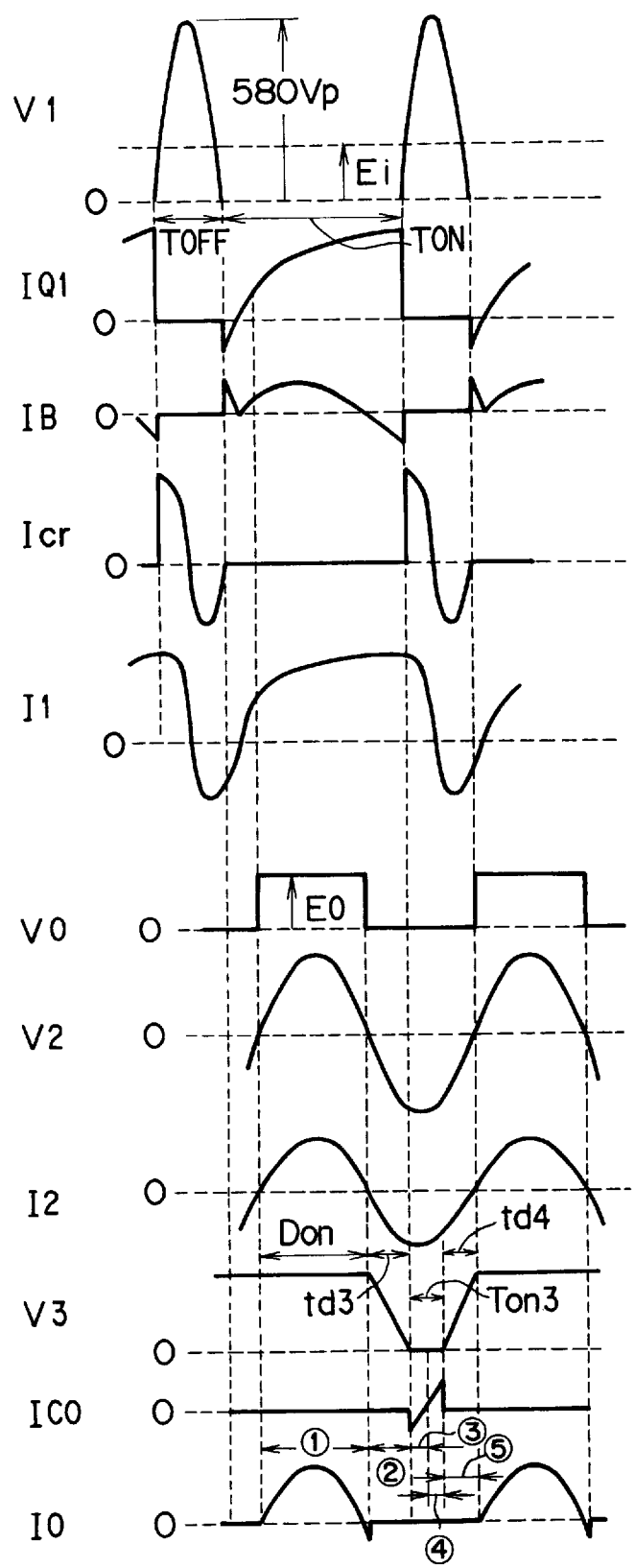
FIGS. 6A to 6K are waveform diagrams showing operation (at a maximum load power) of main parts in the switching power supply circuit of the third embodiment.

Also in this case, at a maximum load power Pomax=200 W, a parallel resonance voltage V1 shown in FIG. 6A has a waveform corresponding to switching timing of a switching device Q1. Specifically, the parallel resonance voltage V1 provides a voltage resonance pulse during a period TOFF during which the switching device Q1 is turned off, while the parallel resonance voltage V1 has a waveform maintained at a zero level during a period TON during which the switching device Q1 is turned on. Thus, voltage resonance type operation is obtained.

As for a current IQ1 flowing through the switching device Q1 at this point, a clamp current of negative polarity first flows through a clamp diode DD at the start of the period TON, and thereafter the current IQ1 rises to a positive level, as shown in FIG. 6B.

A base current flowing from a self-oscillation driving circuit to a base of the switching device Q1 driven by the self-oscillation has a waveform as shown in FIG. 6C.

FIG. 6D shows a parallel resonance current Icr flowing through a parallel resonant capacitor C2. Thus, resonance waveforms for one cycle are obtained by resonance effects in the period TOFF.

A switching output current I1 obtained at a primary winding N1 by such switching operation on the primary side is shown in FIG. 6E.

A secondary-side active clamp circuit 31 in this case also repeats five operation modes ① to ⑤ in each switching cycle. Operation in mode ① is performed during a period Don during which the rectifier diode D01 is turned on. During the period Don, an auxiliary switching device Q3 is in an off state, and a voltage V3 across the auxiliary switching device Q3 has a certain positive level, as shown in FIG. 6I. In this case, as shown in FIG. 6H, a secondary winding current I2 flowing in the secondary winding N2 so as to form a positive-level sine wave flows through the rectifier diode D01 as a rectified current I0 (FIG. 6K) via leakage inductance of the secondary winding N2, and is then stored in a smoothing capacitor C01.

During the period Don in mode ① a secondary winding voltage Vo, which is an alternating voltage across the secondary winding N2, is clamped at a level of a secondary-side direct-current output voltage E01, as shown in FIG. 6F.

Then, the rectifier diode D01 is turned off, whereby mode ① is ended. Operation in mode ② is obtained during the next period td3.

During the period td3 in mode ②, the current I2 that has been flowing through the secondary winding N2 is reversed in direction, as shown in FIG. 6H, and the current flows through a path from the parallel resonant capacitor C2 to a secondary-side ground and to the rectifier diode D02.

After the period td3 in mode ②  has passed, operation in mode ③ begins at the start of the first half of a period Ton3. As shown in FIG. 6G, a voltage V2 across the secondary-side series resonant capacitor Cs reaches a level substantially equal to or higher than that of an initial voltage of the smoothing capacitor C01 during the period in mode ③. Thus, a clamp diode DD3 connected in parallel with the auxiliary switching device Q3 conducts, whereby a current flows through a clamp capacitor CCL. This current is shown as a current Ico in FIG. 6J in the first half of the period Ton3.

In the third embodiment, capacitance of the clamp capacitor CCL is set substantially equal to that of the secondary-side series resonant capacitor Cs, for example. Since the period Ton3, including the period td3, is short, a small current occurring during the period Ton3 flows through the clamp capacitor CCL and hardly flows through the secondary-side series resonant capacitor Cs. Therefore, the voltage V3 across the auxiliary switching device Q3 has a gentle gradient during the periods td3 and td4 before and after the period Ton3, as shown in FIG. 6I. Thus it is possible to control the peak of the voltage V3 across the auxiliary switching device Q3.

When the foregoing first half of the period Ton3 ends and the second half of the period Ton3 begins, the operation is shifted from mode ③ to mode ④.

During the period in mode ④, the auxiliary switching device Q3 is turned into an on state. In this state, a current flows through the auxiliary switching device Q3 as the current Ico of FIG. 6J in the second half of the period Ton3 and a switching output current IQ3. In this case, a path of current from the secondary winding N2 to the clamp capacitor CCL and to the auxiliary switching device Q3 is formed, with a resonance effect produced by the secondary winding N2 and the clamp capacitor CCL.

During the period in modes ③ and ④, the auxiliary switching device Q3 performs ZVS operation, thereby resulting in only a slight switching loss.

After the operation in mode ④ in the period Ton3 is ended, the auxiliary switching device Q3 is turned off, whereby the operation is shifted to mode ⑤ in a period td4. Since the auxiliary switching device Q3 is turned off in mode ⑤, a current of positive polarity flowing in the secondary winding N2 flows through the secondary-side series resonant capacitor Cs, as indicated by current I2 of FIG. 6H. Then, the secondary winding voltage Vo rises to a zero level with a steep gradient, because the secondary-side series resonant capacitor Cs has a small capacitance.

Thereafter, the operations in modes ① to ⑤ are repeated for each switching cycle.

As a result of the operations in modes ① to ⑤, the voltage V3 across the auxiliary switching device Q3 as shown in FIG. 6I is in effect clamped to a certain level. Thus, a product with a low withstand voltage may be selected as the auxiliary switching device Q3.

FIGS. 7A to 7K show operation waveforms of the parts shown in FIGS. 6A to 6K respectively at a minimum load power Pomin=20 W.

Figure 7:
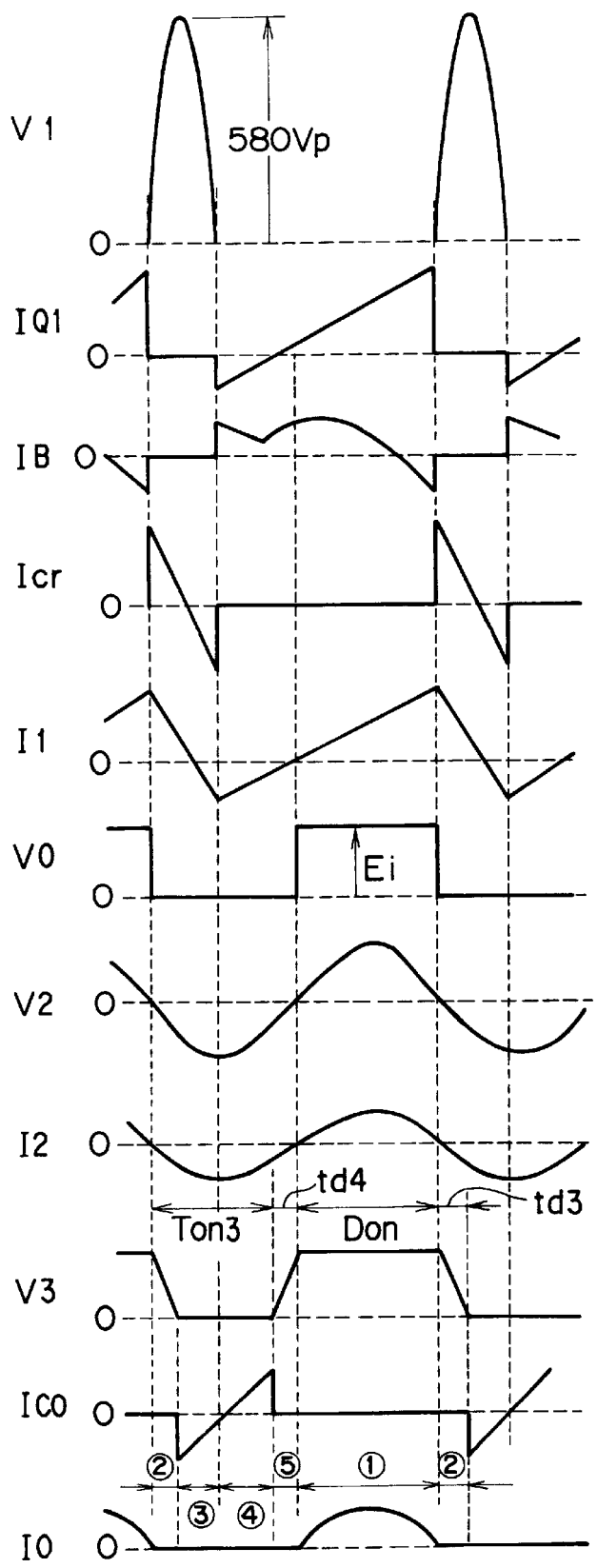
FIGS. 7A to 7K are waveform diagrams showing operation (at a minimum load power) of main parts in the switching power supply circuit of the third embodiment.

A comparison of the parallel resonance voltage V1 of FIG. 7A with that of FIG. 6A indicates that the switching frequency and the duty ratio of an on/off period within one switching cycle of a primary-side voltage resonance type converter are unchanged irrespective of variation in load power.

On the other hand, as shown for example by the operation waveforms of the secondary-side parts of FIGS. 7F to 7I, the switching frequency on the secondary side is fixed at the same frequency as that of the primary-side switching converter, but the duty ratio of an on/off period within one switching cycle on the secondary side is changed.

This is because PWM control of the waveform of a driving signal for driving the auxiliary switching device Q3 is effected according to change in the secondary-side direct-current output voltage E01 due to load variation. Specifically, as is understood from the waveforms of FIGS. 7F to 7I, the power supply circuit of the third embodiment variably controls the on period (Ton3) of the auxiliary switching device Q3 of the secondary-side active clamp circuit 31 according to change in the secondary-side direct-current output voltage. The switching frequency of the rectifier circuit system on the secondary side is dependent on the switching frequency on the primary side, as described above, and therefore is the same as the switching frequency of the primary-side switching converter. This means that the switching frequency of the rectifier circuit system on the secondary side is fixed irrespective of load variation. Therefore, as the on period (Ton3) of the auxiliary switching device Q3 on the secondary side is variably controlled as described above, the conduction angle of the rectifier diode D01 on the secondary side is also variably controlled. In this case, as a result of such variable control, a positive and a negative clamp level of the voltage (resonance voltage) V2 across the secondary-side series resonant capacitor Cs shown in FIGS. 6G and 7G are variably controlled, thereby stabilizing the secondary-side direct-current output voltage E01.

For example, in practice, PWM control of the auxiliary switching device Q3 is effected in such a way that its duty ratio satisfies the following equation:

$$\text{Ton3}/(\text{Don}+\text{Ton3}) = 0.1 \text{ to } 0.5$$

Under conditions of light load as shown in FIGS. 7A to 7K, for example, the operations in modes ① to ⑤ on the secondary side are also performed in one switching cycle as indicated in the figures to thereby clamp the secondary winding voltage Vo, for example.

Values selected for main components in the power supply circuit of FIG. 5 in obtaining experimental results as shown in FIGS. 6A to 6K and FIGS. 7A to 7K are shown in the following for reference.

Secondary winding N2=23 T

Secondary-side series resonant capacitor Cs=clamp capacitor CCL=0.1 µF

Under conditions of medium load, the circuits shown earlier in FIGS. 15 and 16 for example perform an abnormal operation in which ZVS is not performed. On the other hand, since the switching frequency of the power supply circuit of the third embodiment is fixed and therefore is not varied depending on load conditions, the power supply circuit of the third embodiment can perform a stable operation in which ZVS is performed, irrespective of load variation. This makes it possible to prevent an increase in power loss, for example, under conditions of medium load.

Also in the third embodiment, an orthogonal type control transformer PRT is not provided, and therefore it is possible to miniaturize the power supply circuit and improve efficiency in manufacturing the power supply circuit. In addition, the power supply circuit of the third embodiment does not require a protective circuit for dealing with a short circuit in the load.

Figure 8:
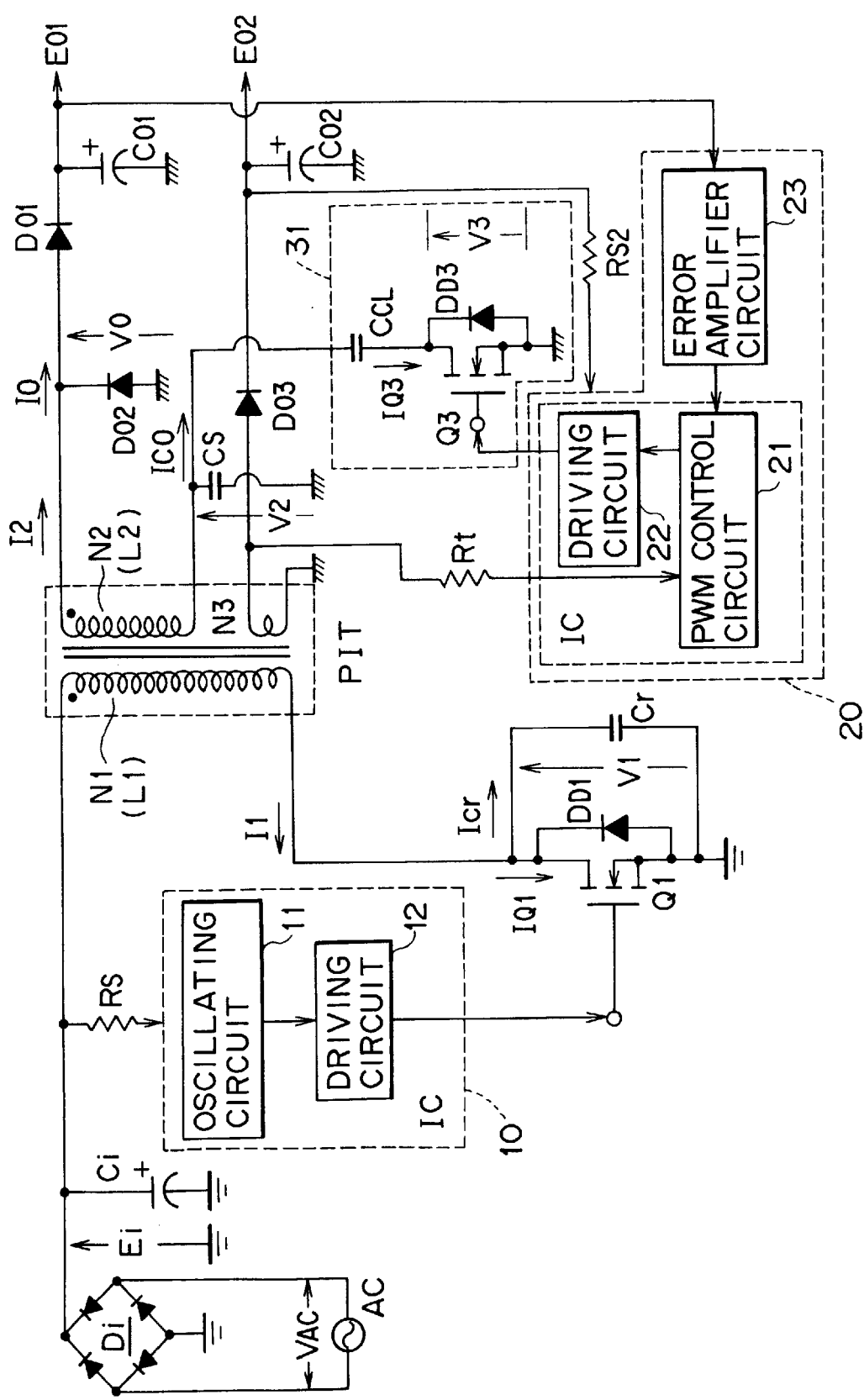
FIG. 8 is a circuit configuration diagram of a switching power supply circuit according to a fourth embodiment of the present invention.

FIG. 8 shows a configuration of a power supply circuit according to a fourth embodiment of the present invention.

In the figure, the same parts as in FIGS. 1, 4, and 5 and the figures showing the prior art circuits (FIGS. 9, 10, 15, and 16) are identified by the same reference numerals, and their description will be omitted.

The circuit shown in FIG. 8 has the same configuration on the secondary side as the power supply circuit shown earlier in FIG. 5. Specifically, a rectifier circuit system on the secondary side forms a voltage doubler rectifier circuit including a secondary-side series resonant circuit and comprising a secondary-side series resonant capacitor Cs, rectifier diodes D01 and D02, and a smoothing capacitor C01, and a secondary-side active clamp circuit 31 is provided for the rectifier circuit.

In addition, an externally excited voltage resonance type converter having a switching device Q1 in the form of a MOS-FET is provided on the primary side of the power supply circuit shown in FIG. 8. Thus, a configuration on the primary side of the power supply circuit shown in FIG. 8 is the same as that on the primary side of the power supply circuit according to the second embodiment shown in FIG. 4.

With such a configuration, the operations on the secondary side described with reference to FIGS. 6A to 6K and FIGS. 7A to 7K make it possible to effect control for constant voltage and clamp a voltage V2 across a secondary-side series resonant capacitor Cs and a voltage V3 across an auxiliary switching device Q3 to control their peak levels.

It is to be noted that embodiments of the present invention are not limited to the configurations shown in the drawings. For example, as the switching device and the auxiliary switching device that play a main role in the present invention, other devices such as a SIT (static induction thyristor) may be employed. Also, configuration of the switching driving unit for external excitation does not need to be limited to those shown in the drawings; it may be modified into an appropriate circuit configuration as required.

In addition, the rectifier circuit on the secondary side including the secondary-side resonant circuit is not limited to the configurations shown in the drawings as embodiments of the present invention; the rectifier circuit may employ different circuit configurations.

As described above, the switching power supply circuit according to the present invention is a complex resonance type switching converter provided with a voltage resonance type converter on the primary side and a parallel resonant circuit or a series resonant circuit on the secondary side, and the voltage resonance type converter on the primary side is driven for switching operation at a fixed switching frequency. An active clamp circuit is provided on the secondary side. The conduction angle of the active clamp circuit within one switching cycle is controlled according to the level of a secondary-side direct-current output voltage, whereby output on the secondary side is stabilized, and also the level of an alternating voltage generated on the secondary side is controlled.

With such a configuration, since control for constant voltage is effected on the secondary side, it is not necessary to insulate the primary side from the secondary side in the case of an externally excited switching converter, for example, and also it is not necessary to simultaneously control the switching frequency and conduction angle of the primary-side switching device. In the case of a self-excited switching converter, it is possible to omit a control transformer on the primary side, for example.

This results in a simple and small-scale circuit configuration for constant-voltage control, thereby allowing reduction in size and cost of the power supply circuit.

In addition, according to the present invention, components having a low withstand voltage may be selected as a switching device, a rectifier diode device, and other components to be provided on the secondary side of the power supply circuit. Moreover, since the amount of current flowing through a parallel/series resonant capacitor on the secondary side can be made small, it is possible to employ a product with a small capacitance and a low withstand voltage as the capacitor device.

Moreover, the low withstand voltage of the components thus selected improves switching characteristics of a switching device, and thereby improves power conversion efficiency.

Furthermore, the selected components having a low withstand voltage are of smaller size, thereby allowing miniaturization of the power supply circuit on a circuit board.

Furthermore, according to the switching driving configuration of the present invention, the switching frequency at the time of a short circuit in a load is fixed, and not decreased as in the case of constant-voltage control effected by changing the switching frequency. Therefore, the auxiliary switching device on the secondary side is allowed to perform switching operation by stable ZVS and ZCS, for example. This eliminates the need for providing an overvoltage protective circuit or an overcurrent protective circuit to deal with a short circuit in a load, and thereby allows substantial miniaturization of the power supply circuit.

It is also possible to prevent occurrence of an abnormal operation in which ZVS is not performed under conditions of medium load.

The configuration of the present invention also makes it possible to suppress ringing of secondary-side rectified current, which occurs when a secondary-side rectifier diode is turned on, to a very low level. This eliminates the need for addition of a snubber circuit, thereby further improving power conversion efficiency.

While a preferred embodiment of the present invention has been described using specific terms, such description is for illustrative purposes only, and it is to be understood that changes and variations may be made without departing from the spirit or scope of the following claims.

What is claimed is:

1. A switching power supply circuit comprising:
   an insulating converter transformer including a primary winding and a secondary winding insulated from each other, said primary winding and said secondary winding being loosely coupled to each other;
   a switching circuit including a switching device for performing switching operation on a current flowing into the primary winding of said insulating converter transformer at a fixed frequency;
   a primary-side parallel resonant capacitor provided on a primary side of said insulating converter transformer for forming a primary-side parallel resonant circuit in conjunction with inductance of said converter transformer;
   a secondary-side resonant capacitor provided on a secondary side of said insulating converter transformer for forming a secondary-side resonant circuit in conjunction with inductance of said converter transformer;

a rectifier circuit for rectifying an alternating voltage obtained on the secondary side of said insulating converter transformer;

an active clamp circuit provided on the secondary side of said insulating converter transformer for clamping the alternating voltage obtained on the secondary side of said insulating converter transformer in synchronism with the switching operation of said switching circuit; and a constant-voltage control circuit for effecting control for constant voltage by controlling a clamping period of said active clamp circuit and controlling an on/off-period duty ratio of a rectifying device of said rectifier circuit according to a level of output voltage of said rectifier circuit.

2. A switching power supply circuit as claimed in claim 1, wherein said switching circuit forms a part of a self-excited voltage resonance type converter.

3. A switching power supply circuit as claimed in claim 1, wherein said secondary-side resonant circuit is a series resonant circuit.

4. A switching power supply circuit as claimed in claim 1, wherein said secondary-side resonant circuit is a parallel resonant circuit.

5. A switching power supply circuit as claimed in claim 1, wherein said secondary-side resonant circuit is a series resonant circuit, and said rectifier circuit is a voltage doubler rectifier circuit.

* * * * *

UNITED STATES PATENT AND TRADEMARK OFFICE
CERTIFICATE OF CORRECTION

PATENT NO. : 6,349,046 B2  Page 1 of 1
DATED : February 19, 2002
INVENTOR(S) : Yasumura It is certified that error appears in the above-identified patent and that said Letters Patent is hereby corrected as shown below:

<u>Title page,</u>
Item [30], should read   -- Foreign Application Priority Data
      [30]   Mar. 24, 2000 (JP) ................ 2000-088539 --

Signed and Sealed this

Third Day of September, 2002

Attest:

Attesting Officer

JAMES E. ROGAN
*Director of the United States Patent and Trademark Office*